United States Patent [19]

Zehavi

[11] Patent Number: 5,471,497
[45] Date of Patent: Nov. 28, 1995

[54] METHOD AND APPARATUS FOR VARIABLE RATE SIGNAL TRANSMISSION IN A SPREAD SPECTRUM COMMUNICATION SYSTEM USING COSET CODING

[76] Inventor: Ephraim Zehavi, 5365 Toscana Way, San Diego, Calif. 92122

[21] Appl. No.: 146,642

[22] Filed: Nov. 1, 1993

[51] Int. Cl.$^6$ .................................................. H04L 27/30
[52] U.S. Cl. ............................................ 375/200; 375/261
[58] Field of Search ................................. 375/1, 25, 38, 375/39; 380/28

[56] References Cited

U.S. PATENT DOCUMENTS

| | | | |
|---|---|---|---|
| 4,507,648 | 3/1985 | Conway et al. | 375/38 |
| 4,896,353 | 1/1990 | Dehgani et al. | 380/28 |
| 5,040,191 | 8/1991 | Forney, Jr. et al. | 375/39 |
| 5,150,381 | 9/1992 | Forney, Jr. et al. | 375/39 |
| 5,297,170 | 3/1994 | Eyuboglu et al. | 375/25 |
| 5,317,639 | 5/1994 | Mittenthal | 380/28 |
| 5,353,352 | 10/1994 | Dent et al. | 375/1 |

Primary Examiner—Salvatore Cangialosi

[57] ABSTRACT

An improved system and method for communicating information at variable data rates over in-phase (I) and quadrature phase (Q) communication channels in a CDMA spread spectrum communication system is disclosed herein. In an exemplary implementation an input information signal is transmitted over either an I or Q communication channel using a direct sequence spread spectrum communication signal. The information signal is initially divided into first and second subsignals, which are respectively provided to first and second coset-encoding networks. The first coset-encoding combines the first subsignal with a first coset code, while the second coset-encoding network combines the second subsignal with a second coset code orthogonal to the first coset code. In this way the first and second coset-encoding networks are operative to produce first and second coset-encoded signals, respectively. A composite coset-encoded signal formed from the first and second coset-encoded signals is then modulated by an orthogonal function signal to provide a first modulated signal. In-phase pseudorandom noise ($PN_I$) and quadrature phase pseudorandom noise ($PN_Q$) signals of predetermined PN codes are used for spreading the first modulated signal for transmission to a receiver over either the I or Q communication channel, respectively. The receiver is operative to produce an estimate of the input information signal on the basis of the modulated carrier signal received over either the I or Q communication channel.

30 Claims, 14 Drawing Sheets

METHOD AND APPARATUS FOR VARIABLE RATE SIGNAL TRANSMISSION IN A SPREAD SPECTRUM COMMUNICATION SYSTEM USING COSET CODING

BACKGROUND OF THE INVENTION

I. Field of the Invention

The present invention relates to communication systems utilizing spread spectrum signals, and, more particularly, to a novel and improved method and apparatus for communicating information in a spread spectrum communication system.

II. Description of the Related Art

Communication systems have been developed to allow transmission of information signals from a source location to a physically distinct user destination. Both analog and digital methods have been used to transmit such information signals over communication channels linking the source and user locations. Digital methods tend to afford several advantages relative to analog techniques, including, for example, improved immunity to channel noise and interference, increased capacity, and improved security of communication through the use of encryption.

In transmitting an information signal from a source location over a communication channel, the information signal is first converted into a form suitable for efficient transmission over the channel. Conversion, or modulation, of the information signal involves varying a parameter of a carrier wave on the basis of the information signal in such a way that the spectrum of the resulting modulated carrier is confined within the channel bandwidth. At the user location the original message signal is replicated from a version of the modulated carrier received subsequent to propagation over the channel. Such replication is generally achieved by using an inverse of the modulation process employed by the source transmitter.

Modulation also facilitates multiplexing, i.e., the simultaneous transmission of several signals over a common channel. Multiplexed communication systems will generally include a plurality of remote subscriber units requiring intermittent service of relatively short duration rather than continuous access to the communication channel. Systems designed to enable communication over brief periods of time with a set of subscriber units have been termed multiple access communication systems.

A particular type of multiple access communication system is known as a spread spectrum system. In spread spectrum systems, the modulation technique utilized results in a spreading of the transmitted signal over a wide frequency band within the communication channel. One type of multiple access spread spectrum system is a code division multiple access (CDMA) modulation system. Other multiple access communication system techniques, such as time division multiple access (TDMA), frequency division multiple access (FDMA) and AM modulation schemes such as amplitude companded single sideband are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention.

In the above-referenced U.S. Pat. No. 4,901,307, a multiple access technique is disclosed where a large number of mobile telephone system users each having a transceiver communicate through satellite repeaters or terrestrial base stations using CDMA spread spectrum communication signals. In using CDMA communications, the frequency spectrum can be reused multiple times thus permitting an increase in system user capacity. The use of CDMA results in a much higher spectral efficiency than can be achieved using other multiple access techniques.

More particularly, communication in a CDMA system between a pair of locations is achieved by spreading each transmitted signal over the channel bandwidth by using a unique user spreading code. Specific transmitted signals are extracted from the communication channel by despreading the composite signal energy in the communication channel with the user spreading code associated with the transmitted signal to be extracted.

In particular spread spectrum communication systems it has been desired to allow various types of user channels (e.g., voice, facsimile, or high-speed data) to operate at different data rates. These systems have typically been designed to have channels operative at a nominal data rate, and also to have reduced data rate traffic channels for providing more traffic data capacity. However, increasing traffic capacity by using reduced data rate channels lengthens the time required for data transmission. Moreover, in certain spread spectrum communication systems there is also a need for increased data rate traffic channels allowing for transmission at data rates higher than the nominal rate.

In order to support data transmission at variable rates it has generally been required to vary the rates of encoding, interleaving and modulation in accordance with the input data rate. This rate variation has typically required relatively sophisticated control of channel encoding and decoding processes, thereby increasing system cost and complexity Accordingly, it is an object of the invention to provide a spread spectrum communication system in which communication channels are available for data transmission at both higher and lower than the nominal system rate.

It is yet another object of the present invention to provide such a spread spectrum communication system in which a common format is used for encoding, interleaving and modulating data to be transmitted at various rates.

It is yet another object of the present invention to provide a CDMA spread spectrum communication system allowing for increases in traffic channel capacity in the absence of corresponding reductions in data rate.

SUMMARY OF THE INVENTION

The implementation of CDMA techniques in spread spectrum communication systems using orthogonal PN code sequences reduces mutual interference between users, thereby allowing higher capacity and better performance. The present invention provides an improved system and method for communicating information over in-phase (I) and quadrature phase (Q) communication channels in a CDMA spread spectrum communication system.

In an exemplary embodiment, an input information signal is transmitted over either an I or Q communication channel using a direct sequence spread spectrum communication signal. The information signal is initially divided into first and second subsignals, which are respectively provided to first and second coset-encoding networks. The first coset-encoding combines the first subsignal with a first coset code, while the second coset-encoding network combines the second subsignal with a second coset code orthogonal to the first coset code. In this way the first and second coset-encoding networks are operative to produce first and second coset-encoded signals, respectively. A composite coset-encoded signal formed from the first and second coset-encoded signals is then modulated by an orthogonal function signal to provide a first modulated signal.

In-phase pseudorandom noise ($PN_I$) and quadrature phase pseudorandom noise ($PN_Q$) signals of predetermined PN codes are used for spreading the first modulated signal over either the I or Q communication channel, respectively. For example, the $PN_I$ signal may be combined with the first modulated signal to provide an I-channel modulation signal for transmission to a receiver via the I communication channel.

In the exemplary embodiment the receiver is operative to produce an estimate of the input information signal on the basis of the modulated carrier signal received over either the I or Q communication channel. The received signal is first demodulated using the orthogonal function signal. The demodulated signal is then decorrelated using a despreading PN signal, with the resultant projection signals being provided to a phase rotator. The phase rotator operates to provide an estimate of the composite coset-encoded signal based on the projection signals and a received pilot signal. Estimates of the first and second subsignals are made by performing a further decorrelation based upon the orthogonality of the first and second coset codes.

BRIEF DESCRIPTION OF THE DRAWINGS

Additional objects and features of the invention will be more readily apparent frown the following detailed description and appended claims when taken in conjunction with the drawings, in which:

DESCRIPTION OF THE PREFERRED EMBODIMENT

Figure 1:
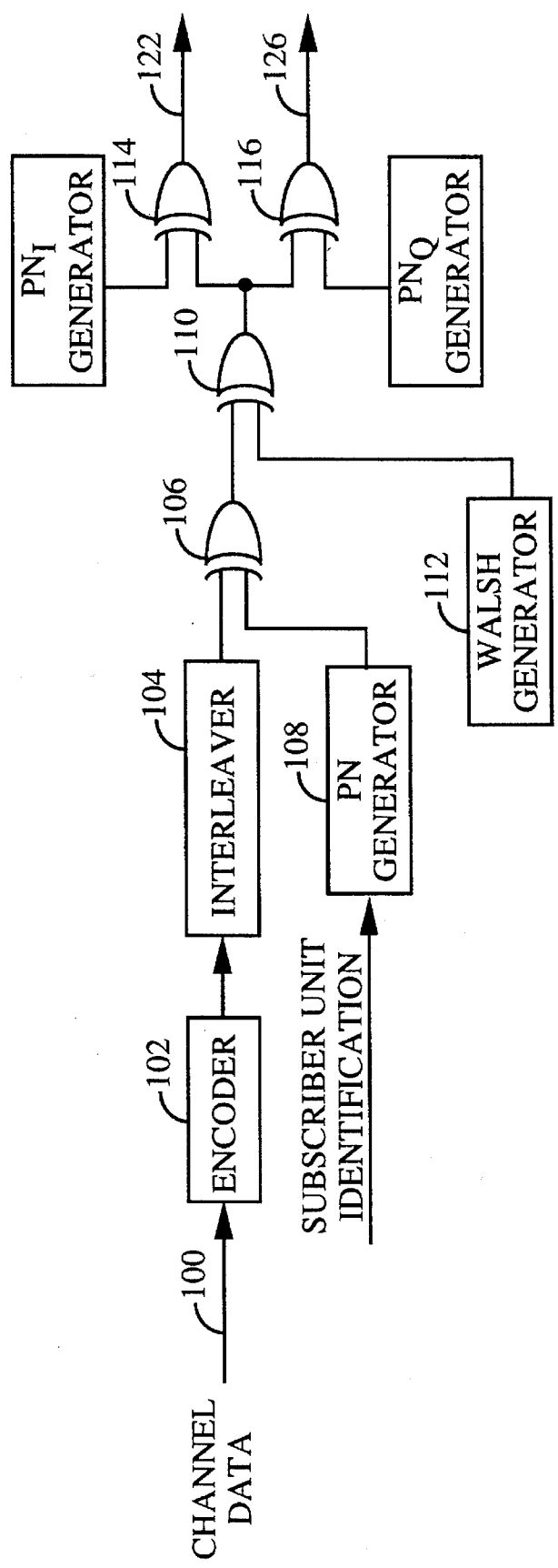
FIG. 1 shows a block diagram of a conventional spread spectrum transmitter.

Referring to FIG. 1, there is shown a spread spectrum transmitter such as is described in U.S. Pat. No. 5,103,459, issued 1992, entitled "SYSTEM AND METHOD FOR GENERATING SIGNAL WAVEFORMS IN A CDMA CELLULAR TELEPHONE SYSTEM", which is assigned to the assignee of the present invention, and which is herein incorporated by reference. In the transmitter of FIG. 1, data bits 100 consisting of, for example, voice converted to data by a vocoder, are supplied to an encoder 102 where the bits are convolutional encoded with code symbol repetition in accordance with the input data rate. When the data bit rate is less than the bit processing rate of the encoder 102, code symbol repetition dictates that encoder 102 repeat the input data bits 100 in order to create a repetitive data stream at a bit rate which matches the operative rate of encoder 102. The encoded data is then provided to interleaver 104 where it is convolutional interleaved. The interleaved symbol data is output from interleaver 104 at an exemplary rate of 19.2 ksps to an input of exclusive-OR gate 106.

In the system of FIG. 1 the interleaved data symbols are scrambled to provide greater security in transmissions over the channel. Scrambling of the voice channel signals may be accomplished by pseudonoise (PN) coding the interleaved data with a PN code specific to an intended recipient subscriber unit. Such PN scrambling may be provided by the PN generator 108 using a suitable PN sequence or encryption scheme. The PN generator 108 will typically include a long PN generator for producing a unique PN code at a fixed PN chip rate of 1.2288 MHz. This PN code is then passed through a decimator, with the resulting 19.2 kilo-symbol per second (ksps) scrambling sequence being supplied to the other input of exclusive-OR 106 in accordance with subscriber unit identification information provided thereto. The output of exclusive-OR 106 is then provided to one input of exclusive-OR 110.

Again referring to FIG. 1, the other input of exclusive-OR gate 110 is connected to a Walsh waveform generator 112. Walsh generator 112 generates a Walsh waveform assigned to the data channel over which information is being transmitted. The Walsh waveform provided by generator 112 is selected from a set of 64 Walsh waveforms, each having a length of length 64 Walsh chips. The 64 orthogonal waveforms correspond to entries within a 64 by 64 Hadamard matrix wherein a particular Walsh waveform is defined by a row or column of the matrix. The scrambled symbol data and Walsh waveform are exclusive-OR'ed by exclusive-OR gate 110 with the result provided as an input to both of the exclusive-OR gates 114 and 116.

Exclusive-OR gate 114 also receives a $PN_I$ signal, while the other input of exclusive-OR gate 116 receives a $PN_Q$ signal. The $PN_I$ and $PN_Q$ signals are pseudorandom noise sequences typically corresponding to a particular area, i.e., cell, covered by the CDMA system and relate respectively to in-phase (I) and quadrature phase (Q) communication channels. The $PN_I$ and $PN_Q$ signals are respectively exclusive-OR'ed with the output of exclusive-OR gate 110 so as to further spread the user data prior to transmission. The resulting I-channel code spread sequence 122 and Q-channel code spread sequence 126 are used to bi-phase modulate a quadrature pair of sinusoids. The modulated sinusoids are summed, bandpass filtered, shifted to an RF frequency, and again filtered and amplified prior to being radiated via an antenna to complete transmission over the communication channel.

Conventional techniques for accommodating variable data rates within the transmission system of FIG. 1 have generally required utilization of a controller for varying the operating rates of the encoder 102, interleaver 104 and Walsh generator 112 in accordance with the input data rate. As is described hereinafter, the present invention enables spread spectrum transmission of an information signal at higher than the nominal rate, or of transmission of a plurality of information signals at lower than the nominal rate, using common encoding, interleaving and modulation rates.

Figure 2:
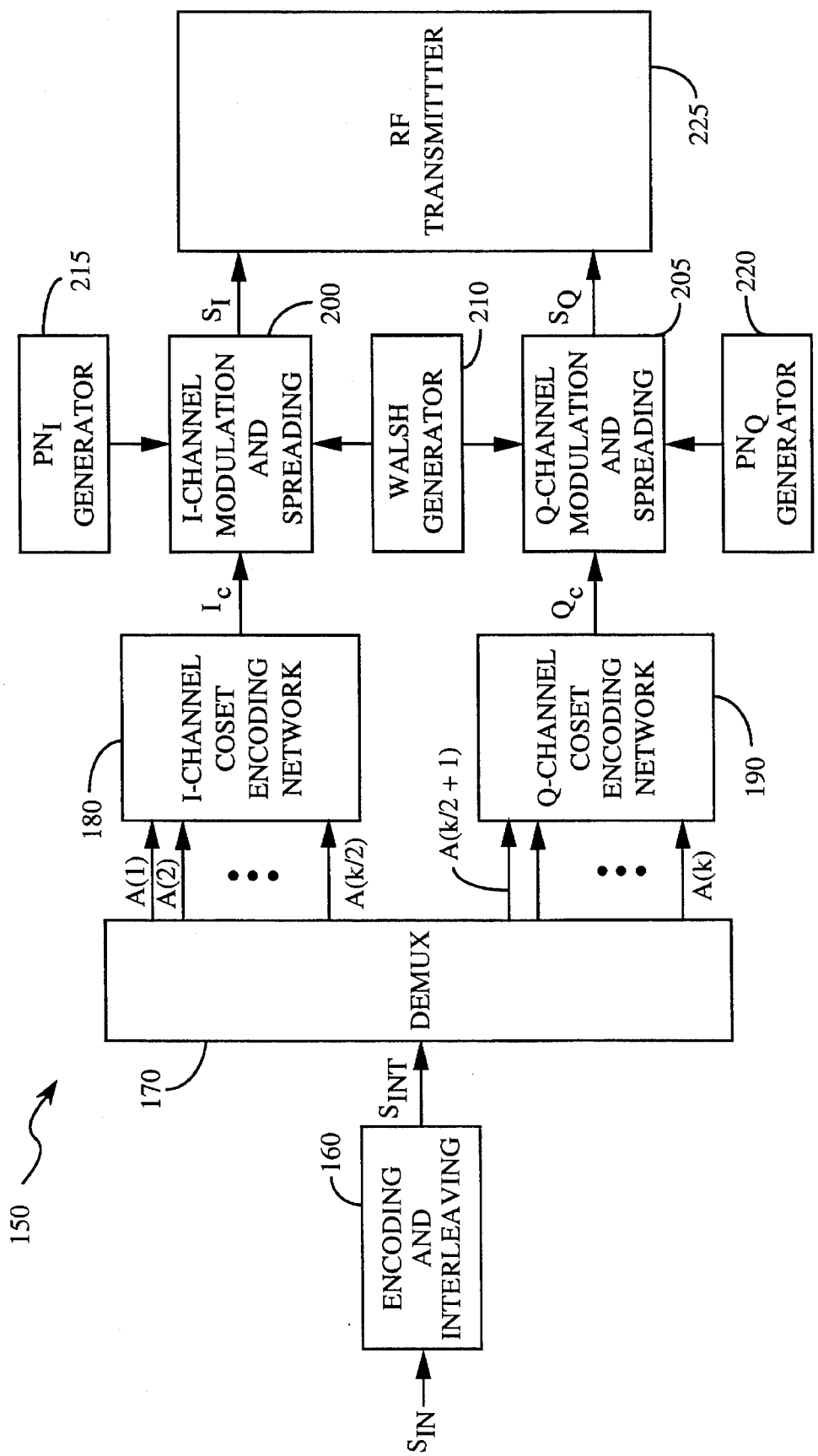
FIG. 2 shows a block diagram of a preferred embodiment of a spread spectrum transmitter disposed to transmit I-channel and Q-channel information signals.

FIG. 2 shows a block diagram of a preferred embodiment of a spread spectrum transmitter 150 of the invention disposed to transmit an input information signal $S_{IN}$ of data rate $kR_b$, where k is an integer constant and $R_b$ denotes a nominal transmitter data (i.e., bit) rate. As employed herein the nominal data rate $R_b$ is defined as being equivalent to the product of the PN chip rate and the convolutional encoding code rate, divided by the number of Walsh chips per symbol of the Walsh waveform. In an exemplary embodiment a nominal transmitter data rate $R_b$ of 9.6 kbps is set by utilizing a set of modulation parameters in which the PN chip rate is selected to be 1.2288 MHz, the convolutional code rate is a rate ½ code, and the Walsh waveform symbol length is set at 64. It is a feature of the present invention that the transmitter 150 may be employed to transmit information signals having data rates greater than or equal to the nominal rate without adjustment of the values of the foregoing modulation parameters. As is described hereinafter, the present invention also provides a technique for transmitting a plurality of information signals of data rates lower than the nominal rate without requiring corresponding modulation parameter adjustment.

In particular applications the input information bit sequence $S_{IN}$ may consist of, for example, voice converted to a stream of data bits by a vocoder. As is indicated by FIG. 2, the input data stream is supplied to an encoding and interleaving network 160. The network 160 convolutional encodes the information bit sequence $S_{IN}$, with the encoded data then being interleaved and output from the network 160 as an encoded and interleaved symbol stream $S_{INT}$. Assuming rate ½ convolutional encoding, the symbol stream $S_{INT}$ is supplied to a demultiplexer 170 at a symbol rate of 2 $kR_b$. The demultiplexer 170 transforms the symbol stream $S_{INT}$ into a set of k symbol substreams {A(1), A(2), ... A(k)} each at a rate of 2 $R_b$, by routing successive symbols $S_{INT,i}$ to successive ones of the substreams {A(1), A(2), ... A(k)}. The first k/2 symbol substreams are provided to an I-channel coset-encoding network 180, while the remaining k/2 symbol substreams are provided to a Q-channel coset-encoding network 190. As is described hereinafter, in exemplary implementations of the coset-encoding networks 180 and 190 the symbol substreams are encoded using orthogonal sets of coset codes of length p, where p=k/2. The coset-encoded symbol substreams within the networks 180 and 190 are then summed into I-channel and Q-channel composite symbol streams $I_c$ and $Q_c$, respectively. Although for completeness both an I-channel and a Q-channel coset-encoding network are depicted in FIG. 2, in particular implementations it may be desired to partition the symbol stream $S_{INT}$ into only k/2 symbol substreams for transmission over either the I-channel or the Q-channel.

Referring again to FIG. 2, a pair of identical Walsh waveforms are provided to I-channel and Q-channel modulation and spreading networks 200 and 205 by a Walsh waveform generator 210. The Walsh waveforms are used within the networks 200 and 205 to modulate the I-channel and Q-channel composite symbol streams $I_c$ and $Q_c$. In addition, PN spreading signals are also respectively provided to the modulation and spreading networks 200 and 205 by $PN_I$ and $PN_Q$ sequence generators 215 and 220. The $PN_I$ sequence is used to spread the composite symbol stream $I_c$ into an I-channel code spread sequence $S_I$. Similarly, the $PN_Q$ sequence is utilized by the network 205 to spread the composite symbol stream $Q_c$ into a Q-channel code spread sequence $S_Q$. The resultant I-channel and Q-channel code spread sequences $S_I$ and $S_Q$ are used to bi-phase modulate a quadrature pair of sinusoids generated within an RF transmitter 225. The modulated sinusoids will generally be summed, bandpass filtered, shifted to an RF frequency, and amplified prior to being radiated via an antenna over I and Q communication channels.

Figure 3:
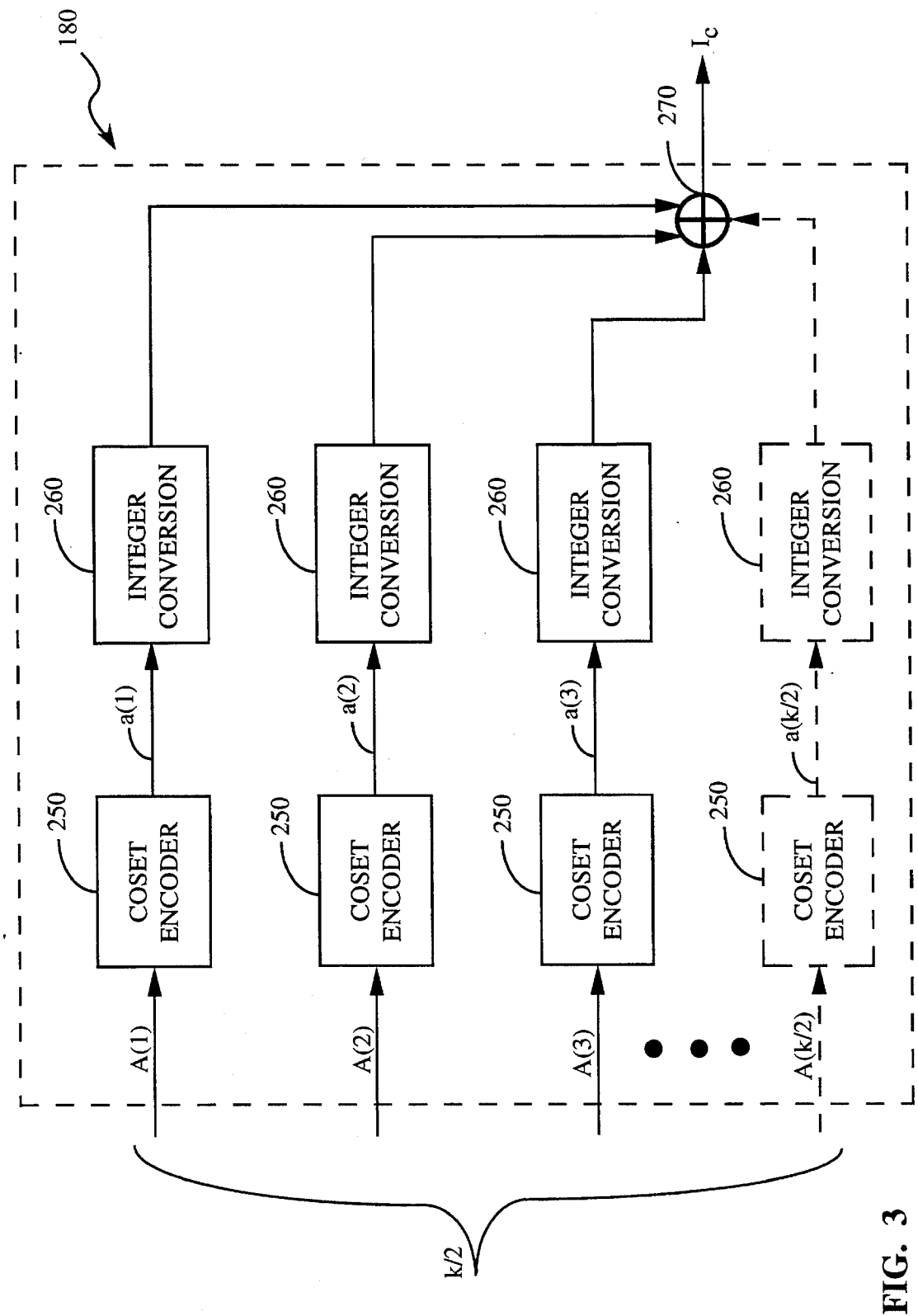
FIG. 3 shows a block diagrammatic representation of an I-channel coset encoding network operative to encode information signals in accordance with the invention.

FIG. 3 shows a block diagrammatic representation of the I-channel coset encoding network 180, it being understood that the Q-channel coset encoding network may be realized in a substantially identical manner. The encoding network 180 includes a plurality of coset encoders 250 to which are supplied the k/2 symbol substreams from the demultiplexer 170. The encoders 250 are operative to generate k/2 sequences {a(1), a(2), ... a(k/2)} in which $a(1)=A(1)[\oplus]S_1$ $a(2)=A(2)[\oplus]S_2$, $a(k/2)=A(k/2)[\oplus]S_{k/2}$ where $S_1, S_2, \ldots S_{k/2}$ form a set of k/2 orthogonal coset codes of length p, and where the operation $[\oplus]$ is defined as follows. Let $A=(a_1, \ldots, a_r)$ be a sequence of length "r" and let $B=(b_1, b_2, \ldots, b_k)$, be a sequence of length "k", then A $[\oplus]$ B denotes the sequence $(a_1 \oplus b_1, \ldots, a_1 \oplus b_k, a_2 \oplus b_1, \ldots, a_2 \oplus b_k, \ldots )$, where $\oplus$ denotes the exclusive-OR operation. In generating the sequences {a(1), a(2), ... a(k/2)} each symbol within the symbol substreams {A(1), A(2), ... A(k)} is repeated "p" times, with the "$p^{th}$" repeated symbol being exclusive-OR'ed with the $p^{th}$ coefficient of the corresponding coset code. This operation has been characterized by those skilled in the art as encoding using a "rate 1/p repetition coset code".

Figure 4:
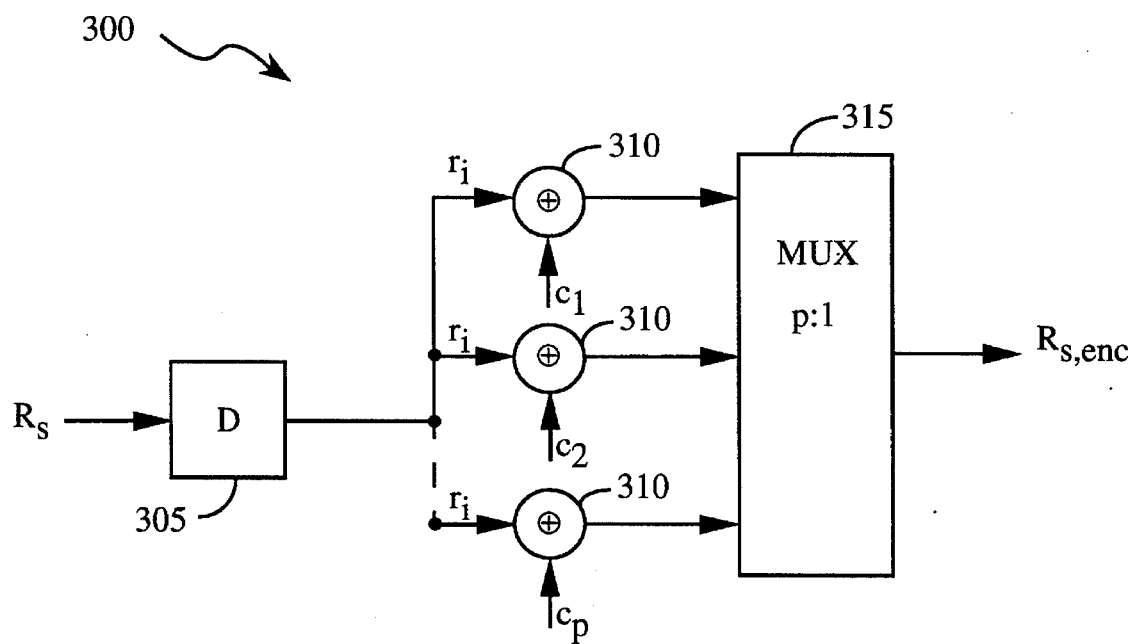
FIG. 4 is a block diagrammatic representation of a rate 1/p coset encoder of a type suitable for inclusion in the coset encoding network of FIG. 3.

FIG. 4 is a block diagrammatic representation of a rate 1/p coset encoder 300 disposed to use a coset code C to encode an input symbol stream $R_s$ into an output coset-encoded symbol stream $R_{s,enc}$, where $C \in \{c_1, c_2, \ldots, c_p\}$. The coset encoder includes a demultiplexer 305 for providing each symbol $r_i$ included within the symbol stream $R_s$ to a set of p exclusive-OR gates 310. Each of the symbols $r_i$ is exclusive-OR'ed with one of the coset code coefficients $c_p$, with the result being supplied to a p:1 multiplexer 315. The multiplexer 315 then produces the coset-encoded symbol stream $R_{s,enc}$, where $R_{s,enc} \in \{r_1 \oplus c_1, r_1 \oplus C_2, \ldots r_1 \oplus c_p, r_2 \oplus c_1, r_2 \oplus c_2, \ldots r_2 \oplus c_p, \ldots, r_i \oplus c_p, \ldots \}$. More generally, for each symbol $r_i$ the rate 1/p coset encoder produces a sequence, $(r_i \oplus c_1, r_i \oplus c_2, \ldots, r_i \oplus c_p) = r_i[\oplus]C.$ Referring again to FIG. 3, in the preferred embodiment the substreams {A(1), A(2), . . . A(k)} and the coset codes $S_1, S_2, \ldots, S_{k/2}$ are composed of the logical values 0 and 1, as are the sequences {a(1), a(2), . . . a(k/2)} generated by the coset encoders 250. The sequences {a(1), a(2), . . . a(k/2)} are converted to an integer, i.e., ±1, representation by a set of binary-to-integer conversion circuits 260 as follows:

$0 \to +1$ $1 \to -1$

As shown in FIG. 3, the sequence $I_c$ is then created by combining the outputs from the conversion circuits 260 within a digital adder 270.

Embodiments Supporting High Data Rates

I. 4×Nominal Rate

Figure 5:
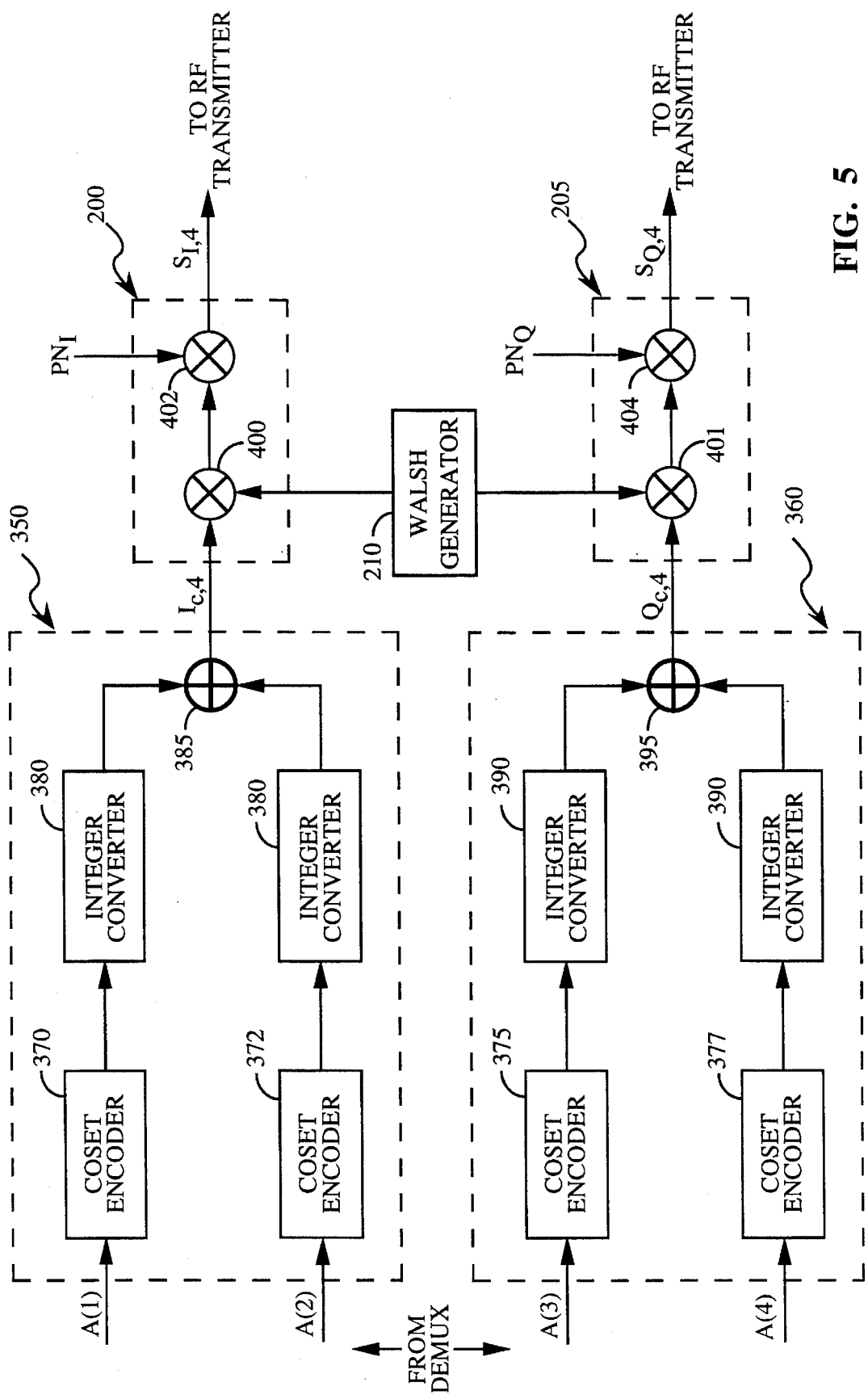
FIG. 5 shows a block diagrammatic representation of a pair of I-channel and Q-channel coset encoding networks utilized in a preferred embodiment of the invention to transmit data at four times a nominal data rate.

FIG. 5 shows a block diagrammatic representation of a pair of I-channel and Q-channel coset encoding networks 350 and 360 utilized in a preferred embodiment of the invention to transmit data at four times the nominal rate. In particular, a rate ½ encoded and interleaved symbol stream at a rate of eight times (e.g., 76.8 ksps) the nominal rate (e.g., 9.6 ksps) is demultiplexed by sequentially assigning symbols to one of four substreams {A(1), A(2), A(3), A(4)}, where A(1)={$A_{11}, A_{12}, \ldots$}, A(2)= {$A_{21}, A_{22}, \ldots$}, A(3)={$A_{31}, A_{32}, \ldots$}, and A(4)={$A_{41}, A_{42}, \ldots$}. In the implementation of FIG. 5 the rate ½ encoded and interleaved symbol stream is derived from an input data bit sequence (not shown) of a rate equivalent to four times the nominal rate. As is indicated by FIG. 5, the substreams A(1) and A(2) are respectively provided to rate ½ coset encoders 370 and 372 within the I-channel coset encoding network 350, while substreams A(3) and A(4) are respectively routed to rate ½ coset encoders 375 and 377 within the Q-channel coset encoding network 360. For rate ½ repetition the coset code (0,0) is used by the encoders 370 and 375 to encode the symbol substreams A(1) and A(3), while the coset code (0,1) is supplied to the coset encoders 372 and 377 for encoding the symbol substreams A(2) and A(4). The encoded substreams from the I-channel coset encoders 370 and 372 are transformed into an integer format (±1) by a pair of binary-to-integer conversion networks 380, and combined within digital adder 385 into the real sequence $I_{c,4}$. In like manner the substreams from the Q-channel coset encoders 375 and 377 are put into an integer format by the binary-to-integer conversion networks 390, and are then added within digital adder 395 to form the real sequence $Q_{c,4}$.

FIG. 5 also shows preferred implementations of the I-channel and Q-channel modulation and spreading networks 200 and 205. The I-channel network 200 includes a multiplier 400 for multiplying the sequences $I_{c,4}$ and $Q_{c,4}$ by a Walsh function W provided by the Walsh generator 210 in an integer (i.e., ±1 format), where in an exemplary implementation W=($W_1, W_2, \ldots, W_{32}, W_{33}, \ldots, W_{64}$). In this way the coset encoding networks 350 and 360 operate in conjunction with the spreading networks 200 and 205 to effectively assign the Walsh function W to the substreams A(1) and A(3), and to assign a Walsh function W* to the substreams A(2) and A(4), where W*=($W_1, W_2, \ldots, W_{32}, -W_{33}, \ldots, -W_{64}$).

A $PN_I$ sequence is provided to a multiplier 402 operative to spread the sequence $I_{c,4}$ into the I-channel code spread sequence $S_{I,4}$ produced by the I-channel network 200. Similarly, a $PN_Q$ sequence is used by multiplier 404 in spreading the sequence $Q_{c,4}$ into a Q-channel code spread sequence $S_{Q,4}$ produced by the network 205. The resultant I-channel and Q-channel code spread sequences $S_{I,4}$ and $S_{Q,4}$ are used to bi-phase modulate a quadrature pair of sinusoids generated within an RF transmitter (not shown).

II. 8×Nominal Rate

Figure 6:
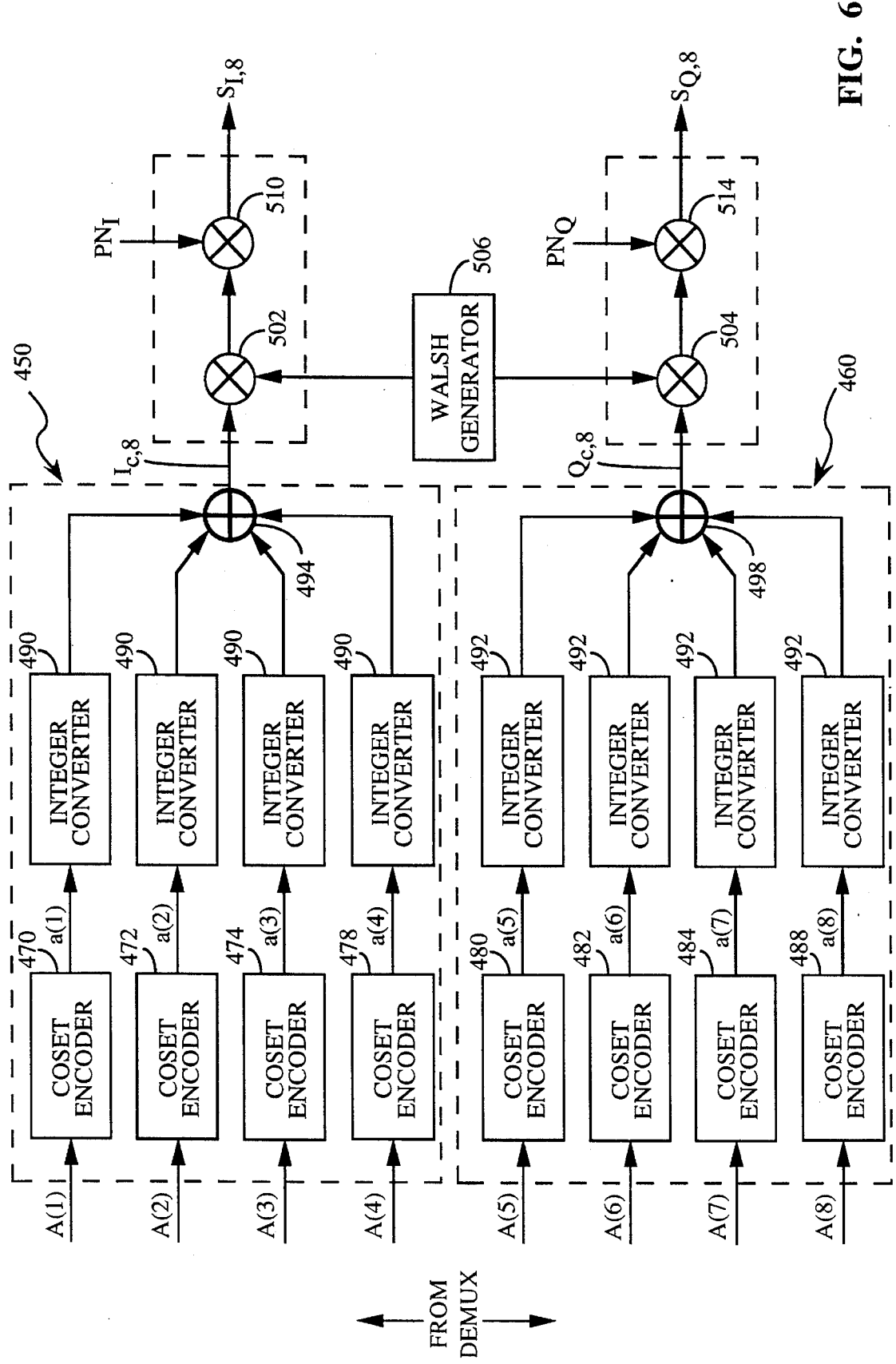
FIG. 6 shows a block diagrammatic representation of a pair of I-channel and Q-channel ¼ rate coset encoding networks utilized in a preferred embodiment of the invention to transmit data at eight times the nominal rate.

FIG. 6 shows a block diagrammatic representation of I-channel and Q-channel ¼ rate coset encoding networks 450 and 460 utilized in a preferred embodiment of the invention to transmit data at eight times the nominal rate. An input bit sequence at eight times the nominal rate is rate ½ encoded and interleaved into a symbol stream at sixteen times (e.g., 153.6 ksps) the nominal rate (e.g., 9.6 kbps) is demultiplexed by sequentially assigning symbols to one of eight substreams A(i), i=1, . . . , 8, where A(i)={$A_{i1}, A_{i2}, \ldots$}, i=1, . . . , 8.

As is indicated by FIG. 5, the substreams A(1)–A(4) are respectively provided to I-channel rate ¼ coset encoders 470, 472, 474 and 478 within the I-channel coset encoding network 450, while substreams A(5)–A(8) are respectively routed to Q-channel rate ¼ coset encoders 480, 482, 484 and 488 within the Q-channel coset encoding network 460. A rate ¼ coset code $S_1$ is used by the encoders 470 and 480 to encode the symbol substreams A(1) and A(5), a coset code $S_2$ is used by the encoders 472 and 482 to encode the symbol substreams A(2) and A(6), a coset code $S_3$ is used by the encoders 474 and 484 to encode the symbol substreams A(3) and A(6), while the coset code $S_4$ is used by the encoders 478 and 488 to encode the symbol substreams A(4) and A(8). The coset codes $S_1$ through $S_4$ are defined as follows:

$S_1 = (s_{11}, s_{12}, s_{13}, s_{14}) = (0,0,0,0);$ $S_2 = (s_{21}, s_{22}, s_{23}, s_{24}) = (0,1,0,1);$ $S_3 = (s_{31}, s_{32}, s_{33}, s_{34}) = (0,0,1,1,);$ and $S_4 = (s_{41}, s_{42}, s_{43}, s_{44}) = (0,1,1,0).$ In this way the eight coset encoders operate to produce a set of eight encoded symbol streams a(i), where i=1, . . . , 8, at a rate (e.g. 76.8 ksps) equivalent to eight times the nominal rate. The encoded symbol streams a(i) are produced in accordance with the following expression:

$$a(i) = \begin{cases} A(i)[\oplus]S_i & 1 \leq i \leq 4 \\ A(i)[\oplus]S_{i-4} & 5 \leq i \leq 8 \end{cases}$$

In order to simplify notation without loss of generality, it will be assumed hereinafter that each substream A(i) is composed of a single symbol $A_i$ rather than the sequence $A_{ij}$, where the subscript "j" represents time. For example, using this notation to define a(8) yields, $a(8) = A_8[\oplus]S_8 = \{A_8 \oplus 0, A_8 \oplus 1, A_8 \oplus 1, A_8 \oplus 0\}$ The sequences a(i), i =1, . . . , 8, are then converted by binary-to-integer converters 490 to a set of real sequences r(i), i=1, . . . , 8, given by $r(i) = (-1)^{a(i)} = ((-1)^{a_{i1}}, \ldots, (-1)^{a_{ip}}) = (r_{i1}, \ldots, r_{ip}).$ where $a_{ij} = A_i \oplus s_{ij}$, and where $s_{ij}$ denotes the $j^{th}$ symbol included within the $i^{th}$ coset code $S_i$. The sequences r(i), i=1, . . . 4, are combined within digital adder 494 into the real sequence $I_{c,8}$. In like manner the real sequences r(i), i=5, . . . , 8, are added within digital adder 498 to form the real sequence $Q_{c,8}$. Referring to FIG. 6, multipliers 502 and 504 are provided for multiplying the sequences $I_{c,8}$ and $Q_{c,8}$ by a Walsh function W provided by the Walsh generator 506, where in an exemplary implementation $W=(W_1, W_2, \ldots, W_{32}, W_{33}, \ldots, W_{64})$. In this way the Walsh functions $W^0$, $W^1$, $W^2$, $W^3$ are effectively assigned to the symbol substreams A(i), i=1, ..., 4, and to A(i), i=5, ..., 8, respectively, where $W^0$, $W^1$, $W^2$, $W^3$ are defined as:

$$W^0 = (W_a, W_b, W_c, W_d);$$

$$W^1 = (W_a, -W_b, W_c, -W_d);$$

$$W^2 = (W_a, W_b, -W_c, -W_d); \text{ and}$$

$$W^3 = (W_a, -W_b, -W_c, W_d).$$

The sequences $W_a$, $W_b$, $W_c$, $W_d$ may be defined in terms of the Walsh waveform W as:

$$W_a = (W_1, \ldots, W_{16});$$

$$W_b = (W_{17}, \ldots, W_{32});$$

$$W_c = (W_{33}, \ldots, W_{48}); \text{ and}$$

$$W_d = (W_{49}, \ldots, W_{64}).$$

A $PN_I$ sequence is provided to a multiplier 510 operative to spread the sequence $I_{c,8}$ into an I-channel code spread sequence $S_{I,8}$. Similarly, a $PN_Q$ sequence is used by multiplier 514 in spreading the real sequence $Q_{c,8}$ into a Q-channel code spread sequence $S_{Q,8}$. The resultant I-channel and Q-channel code spread sequences $S_{I,8}$ and $S_{Q,8}$ are used to bi-phase modulate a quadrature pair of sinusoids generated within an RF transmitter (not shown).

Embodiments Supporting Lower Data Rates

I. ½ Data Rate

Figure 7:
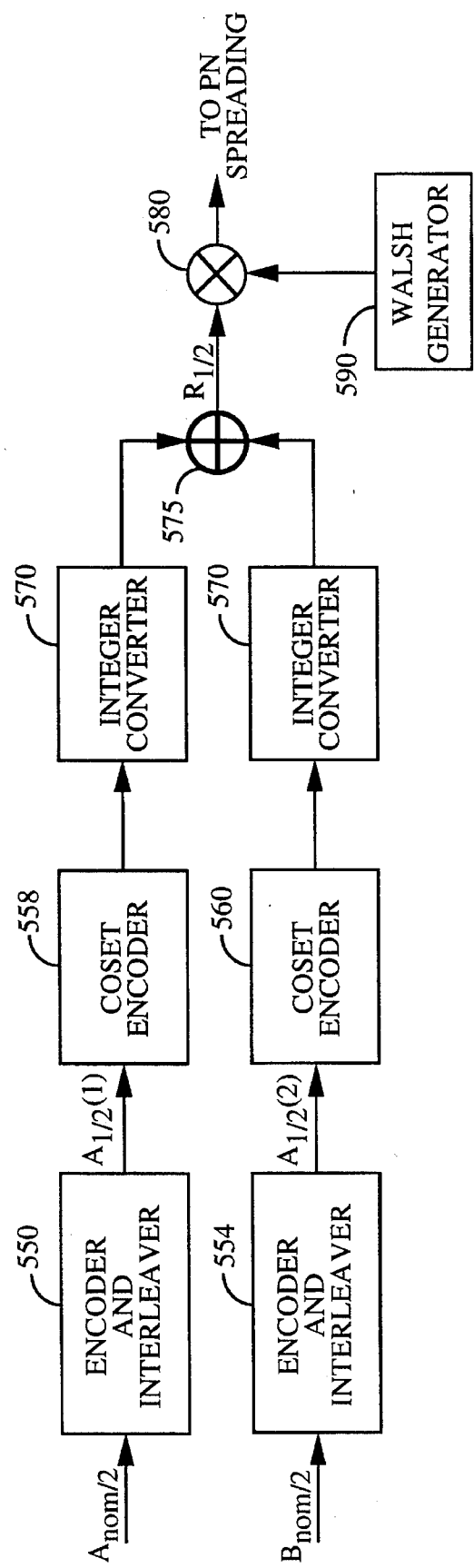
FIG. 7 shows a block diagrammatic representation of a coset encoding network utilized in a preferred embodiment to transmit data at a rate equivalent to one-half of the nominal rate.

Referring to FIG. 7, a pair of input data streams $A_{nom/2}$ and $B_{nom/2}$ are supplied at a data rate equivalent to one-half of the nominal rate to encoding and interleaving networks 550 and 554. The networks 550 and 554 convolutional encode the signals $A_{nom/2}$ and $B_{nom/2}$ into encoded and interleaved symbol streams $A_{1/2}(1)$ and $A_{1/2}(2)$, where $A_{1/2}(1) = \{A_{11}, A_{12}, \ldots\}$, and $A_{1/2}(2) = \{A_{21}, A_{22}, \ldots\}$. Assuming rate ½ convolutional encoding, the resultant interleaved symbol streams $A_{1/2}(1)$ and $A_{1/2}(2)$ are supplied at the nominal rate to coset encoders 558 and 560. The coset code $S_1$, where $S_1=(0,0)$, is used by the encoder 558 to rate ½ repetition encode the symbol substream $A_{1/2}(1)$ into an encoded substream $a_{1/2}(1)$. In similar manner the coset code $S_2$, where $S_2=(0,1)$, is supplied to the coset encoder 560 for rate ½ repetition encoding of the symbol substream $A_{1/2}(2)$ into an encoded substream $a_{1/2}(2)$. The encoded substreams $a_{1/2}(1)$ and $a_{1/2}(2)$ are defined as:

$$a_{1/2}(1) = A_{1/2}(1)[\oplus]S_1 = \{A_{11} \oplus 0, A_{11} \oplus 0, \ldots\}, \text{ and}$$

$$a_{1/2}(2) = A_{1/2}(2)[\oplus]S_2 = \{A_{21} \oplus 0, A_{21} \oplus 1, \ldots\}.$$

The encoded substreams are output from the coset encoders 558 and 560 at twice the nominal rate and are transformed into an integer format (±1) by a pair of binary-to-integer conversion networks 570. The resulting real sequences $r_j(1)$ and $r_j(2)$ are combined within digital adder 575 into the real sequence $R_{1/2}$ for subsequent transmission to a $j^{th}$ receiver area. The real sequence $R_{1/2}$ is provided to a multiplier 580 for multiplication by a Walsh function W provided by a Walsh generator 590, where in an exemplary implementation $W=(W_1, W_2, \ldots, W_{32}, W_{33}, \ldots, W_{64})$. This results in assignment of the Walsh function (W, W) to the symbol stream $A_{1/2}(1)$, and assignment of the Walsh function W* to symbol stream $A_{1/2}(2)$, where $W^* = (W, -W)$. Following multiplication by the Walsh function W, the sequence $R_{1/2}$ will generally be spread by a pseudorandom $PN_I$ or $PN_Q$ sequence for RF transmission over either a corresponding in-phase (I) or quadrature phase (Q) communication channel.

II. ¼ Data Rate

Figure 8:
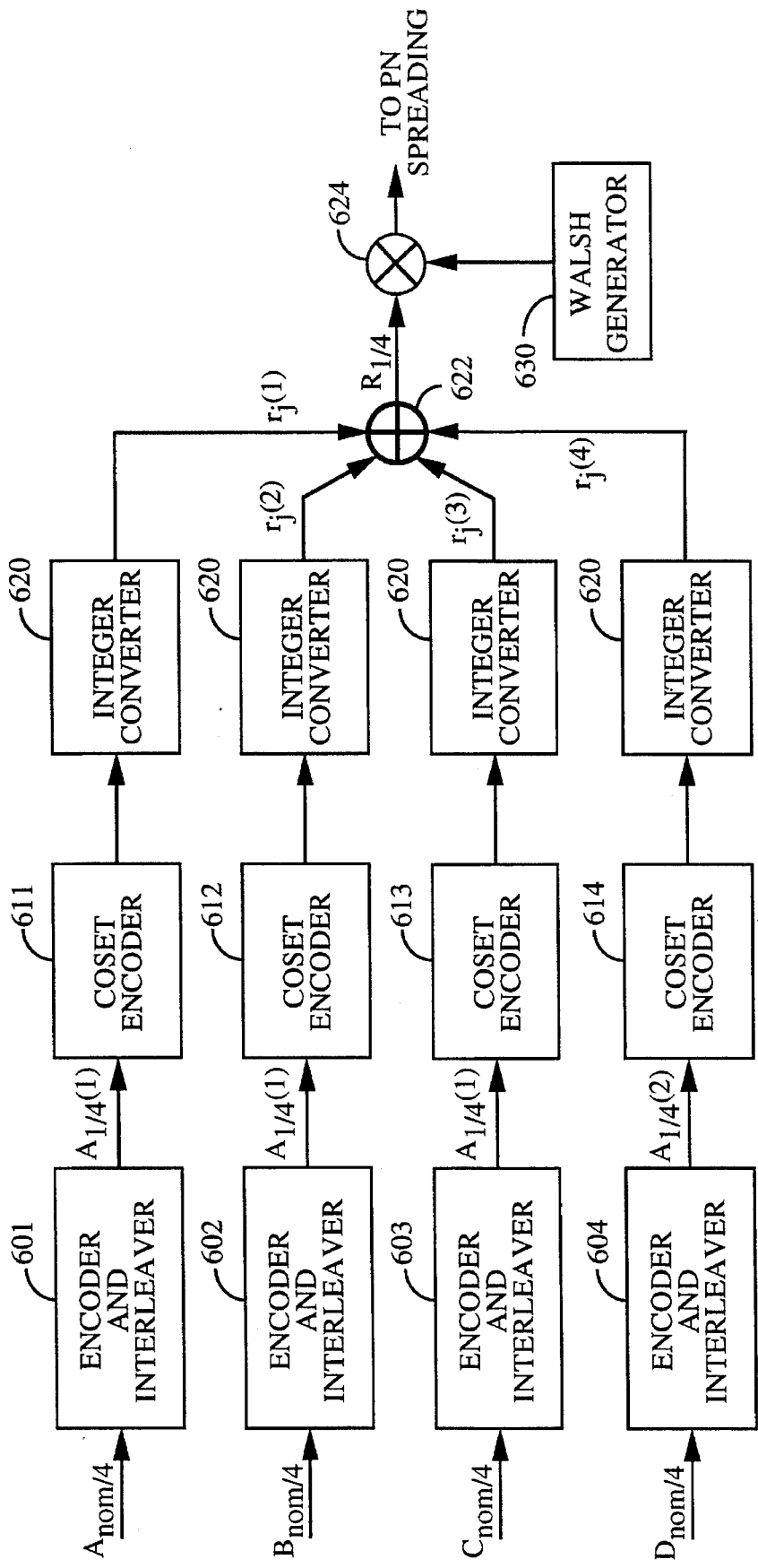
FIG. 8 shows a block diagrammatic representation of a coset encoding network utilized in a preferred embodiment to transmit data at a rate equivalent to one-fourth of the nominal rate.

Referring to FIG. 8, a set four input data streams $A_{nom/4}$, $B_{nom/4}$, $C_{nom/4}$ and $D_{nom/4}$ are supplied at a data rate equivalent to one-fourth of the nominal rate to encoding and interleaving networks 601, 602, 603 and 604. The networks 601–604 convolutional encode the data streams $A_{nom/4}$, $B_{nom/4}$, $C_{nom/4}$ and $D_{nom/4}$ into encoded and interleaved symbol streams $A_{1/4}(1)$, $A_{1/4}(2)$, $A_{1/4}(3)$ and $A_{1/4}(4)$, where $$A_{1/4}(1) = \{A_{11}, A_{12}, \ldots\},$$

$$A_{1/4}(2) = \{A_{21}, A_{22}, \ldots\},$$

$$A_{1/4}(3) = \{A_{31}, A_{32}, \ldots\}, \text{ and}$$

$$A_{1/4}(4) = \{A_{41}, A_{42}, \ldots\}.$$

Assuming rate ½ convolutional encoding, the resultant interleaved symbol streams $A_{1/4}(1)$, $A_{1/4}(2)$, $A_{1/4}(3)$ and $A_{1/4}(4)$ are supplied at one-half of the nominal rate to coset encoders 611, 612, 613 and 614. The coset codes {(0000), (0101), (0011), (0110)} are respectively used by the coset encoders 611–614 to encode the symbol streams $A_{1/4}(1)$, $A_{1/4}(2)$, $A_{1/4}(3)$ and $A_{1/4}(4)$ into the encoded substreams $a_{1/4}(1)$, $a_{1/4}(2)$, $a_{1/4}(3)$, and $a_{1/4}(4)$. The substreams $a_{1/4}(1)$, $a_{1/4}(2)$, $a_{1/4}(3)$, and $a_{1/4}(4)$ may be represented as:

$$a_{1/4}(1) = \{A_{11} \oplus 0, A_{11} \oplus 0, A_{11} \oplus 0, A_{11} \oplus 0, \ldots\},$$

$$a_{1/4}(2) = \{A_{21} \oplus 0, A_{21} \oplus 1, A_{21} \oplus 0, A_{21} \oplus 1, \ldots\},$$

$$a_{1/4}(3) = \{A_{31} \oplus 0, A_{31} \oplus 0, A_{31} \oplus 1, A_{31} \oplus 1, \ldots\}, \text{ and}$$

$$a_{1/4}(4) = \{A_{41} \oplus 0, A_{41} \oplus 1, A_{41} \oplus 1, A_{41} \oplus 0, \ldots\}.$$

The encoded substreams are output from the coset encoders 611–614 at twice the nominal rate and are transformed into an integer format (±1) by binary-to-integer conversion networks 620. A set of resulting real $r_j(i)$, i=1 to 4, sequences for transmission to a $j^{th}$ receiver are combined within digital adder 575 into the real sequence $R_{1/4}$. The real sequence $R_{1/4}$ is provided to a multiplier 624 for multiplication by a Walsh function $W_j$ associated with the $j^{th}$ receiver. The sequence $W_j$ is provided by a Walsh generator 630, and is defined as $W_j = (W_{j1}, W_{j2}, \ldots, W_{j32}, W_{j33}, \ldots, W_{j64})$. This results in assignment of the Walsh functions $W^0$, $W^1$, $W^2$, $W^3$ to the symbol streams $A_{1/4}(1)$, $A_{1/4}(2)$, $A_{1/4}(3)$ and $A_{1/4}(4)$, where $W^0$, $W^1$, $W^3$, $W^4$ are given by:

$$W^0 = (W_j, W_j, W_j, W_j);$$

$$W^1 = (W_j, -W_j, W_j, -W_j);$$

$$W^2 = (W_j, W_j, -W_j, -W_j); \text{ and}$$

$$W^3 = (W_j, -W_j, -W_j, W_j).$$

It is thus apparent that four distinct information signals, respectively identified by the Walsh waveforms $W^0$, $W^1$, $W^3$, $W^4$, are capable of being transmitted to the $j^{th}$ receiver through utilization of a single Walsh waveform $W_j$ in conjunction with the coset-encoding technique contemplated by the invention. Subsequent to being multiplied by the Walsh function $W_j$, the sequence $R_{1/4}$ will typically be spread by a pseudorandom $PN_I$ or $PN_Q$ sequence for RF transmission over either a corresponding in-phase (I) or quadrature phase (Q) communication channel.

Assuming transmission over the I channel to the $j^{th}$ user, the transmitted sequence synthesized from the sequences $r_j(i)$ may be represented as $$S_{Ij} = \left( \sum_{i=1}^{p} r_j(i) \right) \cdot W_j \cdot PN_I.$$

where p=4 in the example of FIG. 8. If transmission were instead to occur over the Q channel, the transmitted sequence would be represented as:

$$S_{Qj} = \left( \sum_{i=p+1}^{k} r_j(i) \right) \cdot W_j \cdot PN_Q.$$

Exemplary sets of parameters used in supporting transmission of input symbol streams at various data rates ($R_b$) are summarized below in Table I. For each data rate Table I provides a corresponding input symbol repetition rate, repetition coset code rate, as well as Walsh waveform length and chip rate. Each entry (X-Y) within the "Demux" column specifies the number of input symbol streams (X) at the associated data rate $R_b$, and the number of symbol substreams (Y) into which the input symbol stream(s) are demultiplexed for coset-encoding.

channel may be characterized as an unmodulated spread spectrum signal used for signal acquisition and tracking purposes. In systems incorporating a plurality of transmitters in accordance with the invention, the set of communication channels provided be each will be identified by a unique pilot signal. However, rather than using a separate set of PN generators for the pilot signals, it is realized that a more efficient approach to generating a set of pilot signals is to use shifts in the same basic sequence. Utilizing this technique an intended receiver unit sequentially searches the whole pilot sequence and tunes to the offset or shift that produces the strongest correlation.

Accordingly, the pilot sequence will preferably be long enough that many different sequences can be generated by shifts in the basic sequence to support a large number of pilot signals in the system. In addition, the separation or shifts must be great enough to ensure that there is no interference in the pilot signals. Hence, in an exemplary embodiment the pilot sequence length is chosen to be $2^{15}$, which allows for 512 distinct pilot signals with offsets in a basic sequence of 64 chips.

Figure 9:
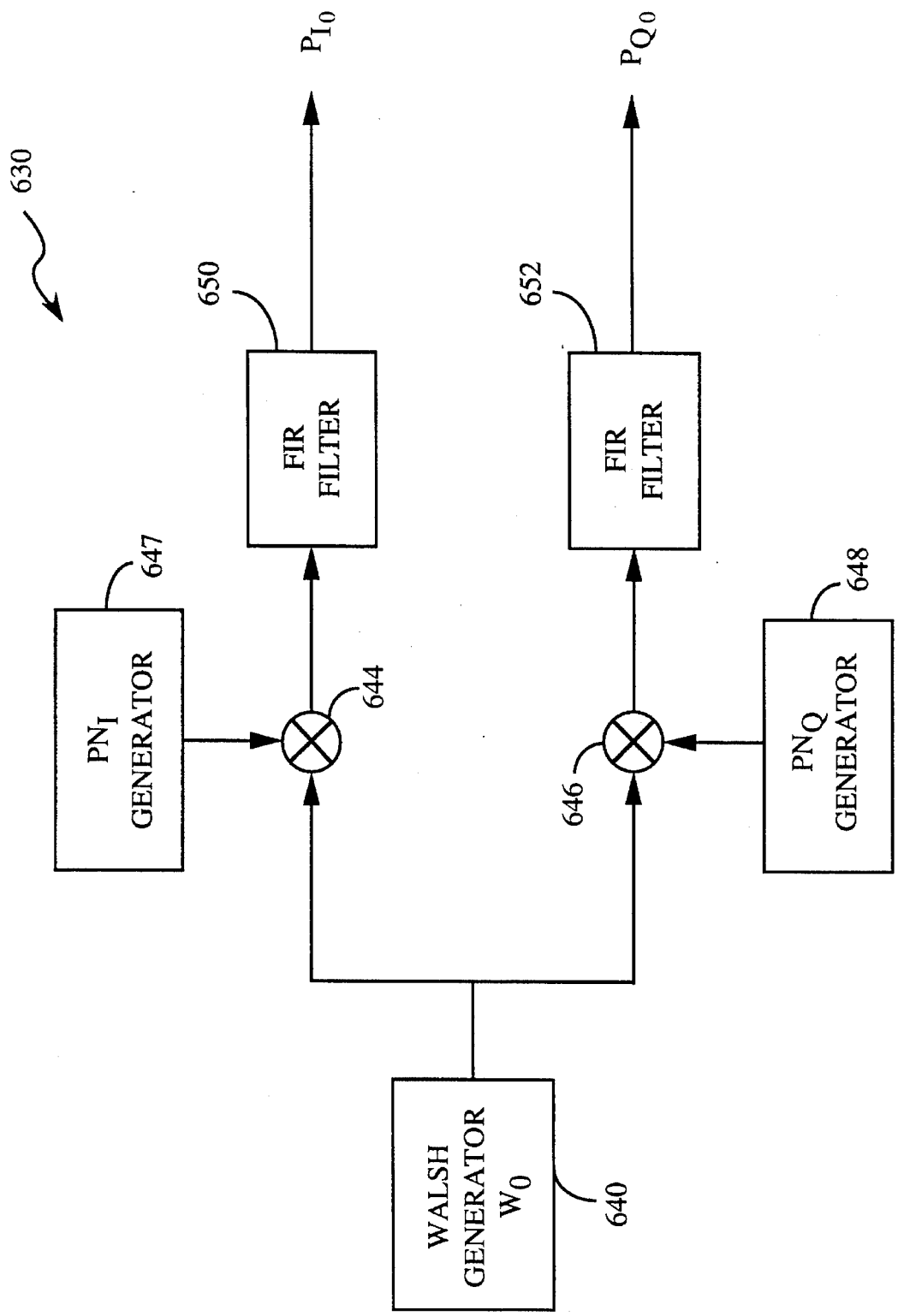
FIG. 9 depicts a pilot generation network for providing I and Q channel pilot sequences.

Referring to FIG. 9, a pilot generation network 630 includes a Walsh generator 640 for providing the Walsh "zero" $W_o$ waveform consisting of all zeroes to digital multipliers 644 and 646. The Walsh waveform $W_o$ is multiplied by the $PN_I$ and $PN_Q$ sequences provided by $PN_I$ and $PN_Q$ generators 647 and 648 to the multipliers 644 and 646, respectively. Since the waveform $W_o$ includes only ones, the information content of the resultant sequences depends only upon the $PN_I$ and $PN_Q$ sequences. The sequences produced by multipliers 644 and 646 are provided as inputs to Finite Impulse Response Filters (FIR) filters 650 and 652. The filtered sequences output from FIR filters 650 and 652,

TABLE I

| $R_b$ [kbs] | Rate 1/p Input Symbol Repetition | I/Q Channel | Demux | Rate 1/p Coset Code Repetition | Walsh Length | Walsh Code Rate [Mcps] |
|---|---|---|---|---|---|---|
| 9.6 | 1 | I or Q | 1—1 | 1 | 64 | 1.2288 |
| 4.8 | ½ | I or Q | 2—2 | ½ | 64 | 1.2288 |
| 2.4 | ¼ | I or Q | 4—4 | ¼ | 64 | 1.2288 |
| 1.2 | ⅛ | I or Q | 8—8 | ⅛ | 64 | 1.2288 |
| 19.2 | 1 | I and Q | 1-2 | 1 | 64 | 1.2288 |
| 38.4 | 1 | I and Q | 1-4 | ½ | 64 | 1.2288 |
| 76.8 | 1 | I and Q | 1-8 | ¼ | 64 | 1.2288 |
| 19.2 | 1 | I or Q | 1—1 | 1 | 128 | 2.457 |
| 9.6 | ½ | I or Q | 2—2 | ½ | 128 | 2.457 |
| 4.8 | ¼ | I or Q | 4—4 | ¼ | 128 | 2.457 |
| 2.4 | ⅛ | I or Q | 8—8 | ⅛ | 128 | 2.457 |
| 1.2 | 1/16 | I or Q | 16—16 | 1/16 | 128 | 2.457 |
| 38.4 | 1 | I and Q | 1-2 | 1 | 128 | 2.457 |
| 76.8 | 1 | I and Q | 1-4 | ½ | 128 | 2.457 |
| 153.6 | 1 | I and Q | 1-8 | ¼ | 128 | 2.457 |
| 38.4 | 1 | I or Q | 1—1 | 1 | 256 | 4.9 |
| 19.2 | ½ | I or Q | 2—2 | ½ | 256 | 4.9 |
| 9.6 | ¼ | I or Q | 4—4 | ¼ | 256 | 4.9 |
| 4.8 | ⅛ | I or Q | 8—8 | ⅛ | 256 | 4.9 |
| 2.4 | 1/16 | I or Q | 16—16 | 1/16 | 256 | 4.9 |
| 1.2 | 1/32 | I or Q | 32—32 | 1/32 | 256 | 4.9 |
| 38.4 | 1 | I and Q | 1-2 | 1 | 256 | 4.9 |
| 76.8 | 1 | I and Q | 1-4 | ½ | 256 | 4.9 |
| 153.6 | 1 | I and Q | 1-8 | ¼ | 256 | 4.9 |

Transmission of the Coset-Encoded Data Over the I and Q channels

Figure 10:
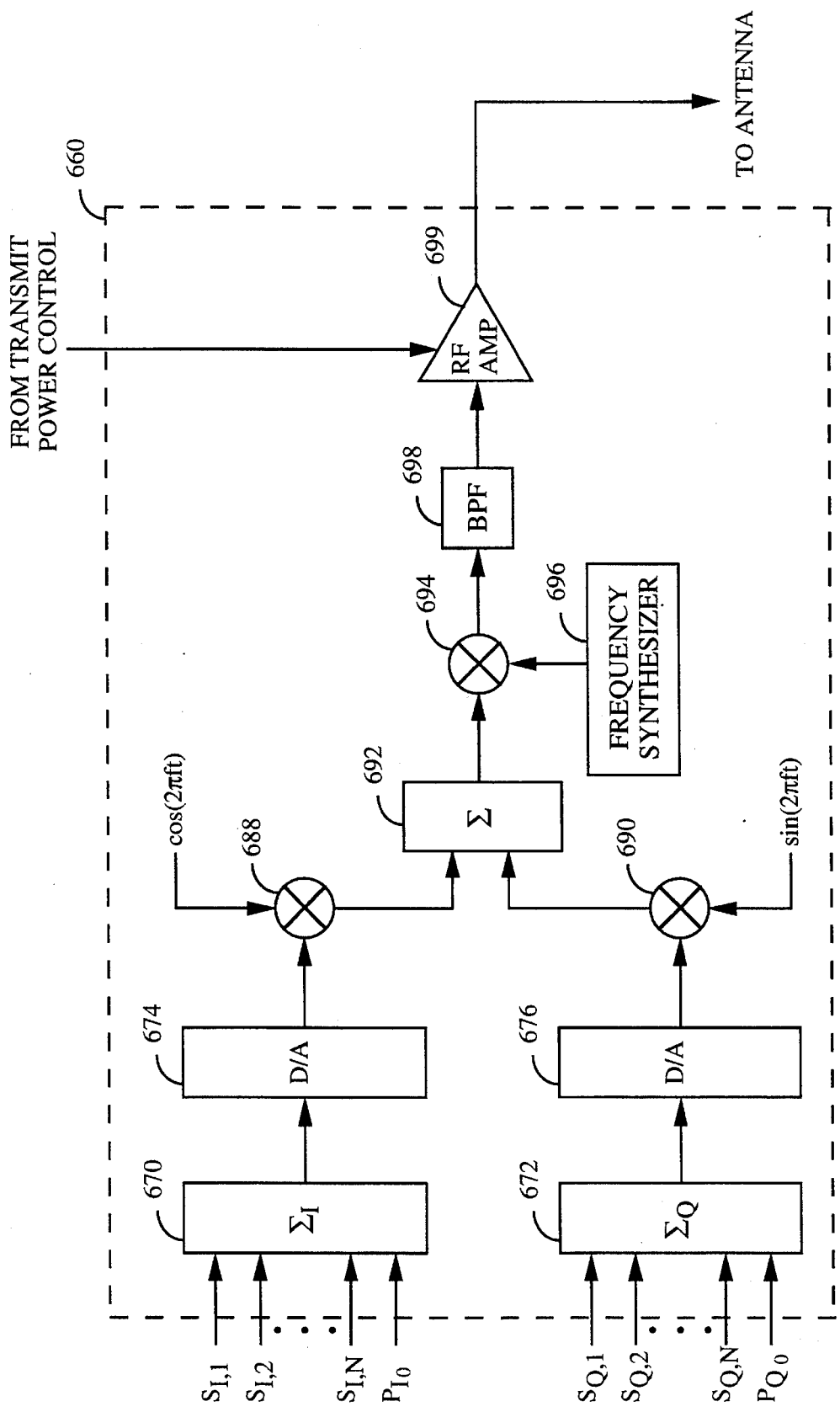
FIG. 10 shows an exemplary implementation of an RF transmitter incorporated within a preferred embodiment of the invention.

In the preferred embodiment, a pilot channel containing no data modulation is transmitted together the "N" receivers within a given cell or sector together with the I-channel and Q-channel spread sequences $S_{Ij}$ and $S_{Qj}$ j=1 to N The pilot respectively corresponding to I-channel and Q-channel pilot sequences $P_{Io}$ and $P_{Qo}$, are supplied to the RF transmitter 660 (FIG. 10).

Referring to FIG. 10, there is shown an exemplary implementation of the RF transmitter 660. Transmitter 660 includes an I-channel summer 670 for summing the set of $PN_I$ spread data signals $S_{Ij}$, j=1 to N, with the I-channel pilot $P_{Io}$ for transmission to the N receivers within a specified cell or sector. Similarly, a Q-channel summer 672 serves to combine the set of $PN_Q$ spread data signals $S_{Qj}$, j=1 to N, with the Q-channel pilot $P_{Qo}$. Digital to analog (D/A) converters 674 and 676 are provided for converting the digital information from the I-channel and Q-channel summers 670 and 672, respectively, into analog form. The analog waveforms produced by D/A converters 674 and 676 are provided along with local oscillator (LO) carrier frequency signals Cos(2πft) and Sin(2πft), respectively, to mixers 688 and 690 where they are mixed and provided to summer 692. The quadrature phase carrier signals Sin(2πft) and Cos(2πft) are provided from suitable frequency sources (not shown). These mixed IF signals are summed in summer 692 and provided to mixer 694.

Mixer 694 mixes the summed signal with an RF frequency signal from frequency synthesizer 696 so as to provide frequency upconversion to the RF frequency band. The RF signal includes in-phase (I) and quadrature phase (Q) components, and is bandpass filtered by bandpass filter 698 and output to RF amplifier 699. Amplifier 699 amplifies the band limited signal in accordance with an input gain control signal from transmit power control circuitry (not shown). It should be understood that differing implementations of the RF transmitter 630 may employ a variety of signal summing, mixing, filtering and amplification techniques not described herein, but which are well known to those in the art.

Figure 11:
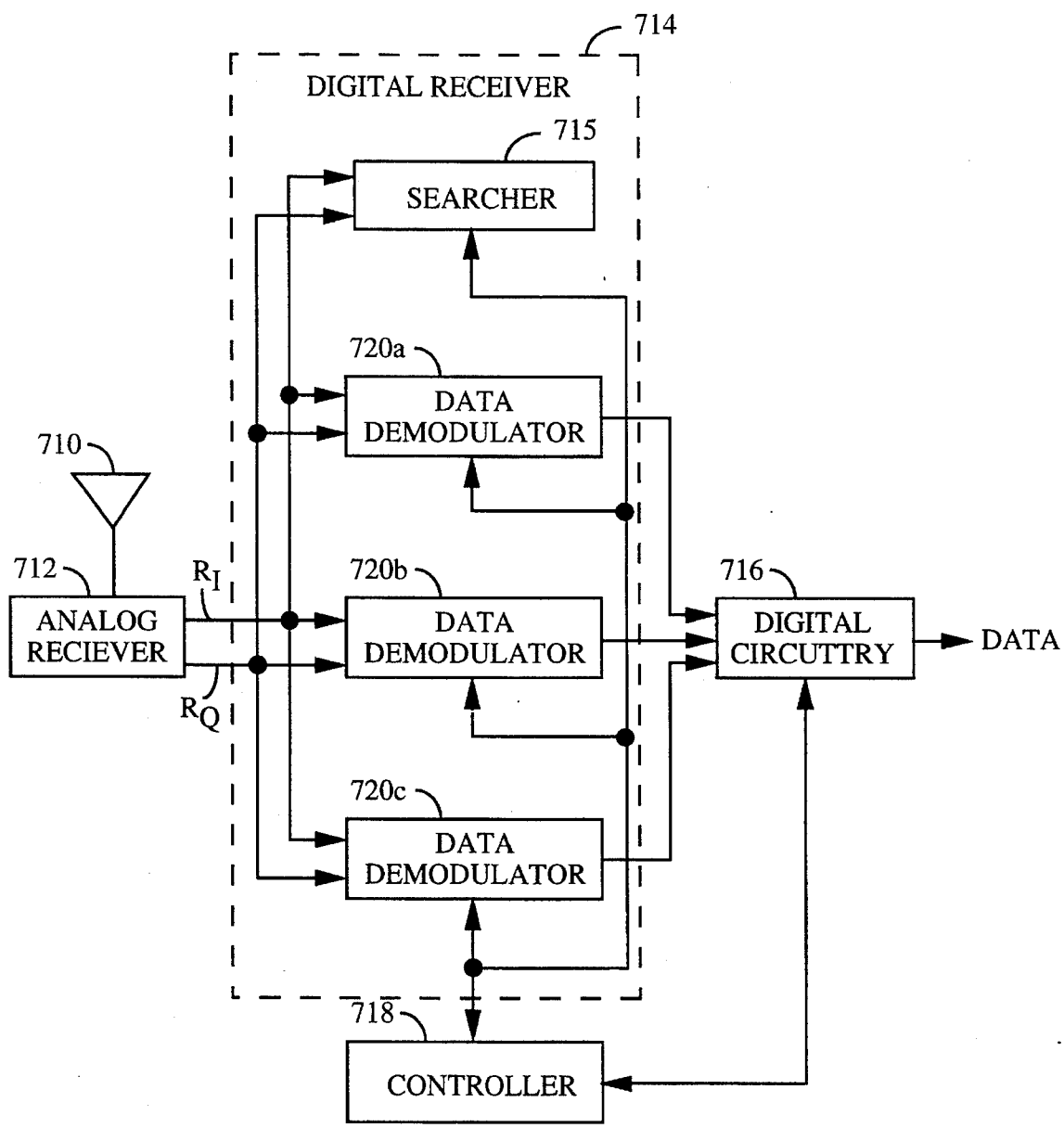

FIG. 11 is a block diagram of an exemplary diversity receiver disposed to receive the RF signal provided by the RF transmitter 630. In FIG. 11 the transmitted RF signal is received by antenna 710 and provided to a diversity RAKE receiver which is comprised of analog receiver 712 and digital receiver 714. The signal as received by antenna 710 and provided to analog receiver 712 may be comprised of multipath propagations of the same pilot and data signals intended for individual or multiple subscriber receivers. Analog receiver 712, which is configured in the exemplary embodiment as a QPSK modem, frequency downconverts, and digitizes the received signal into composite I and Q components. The composite I and Q components are provided to digital receiver 714 for demodulation. The demodulated data is then provided to digital circuitry 716 for combining, deinterleaving and decoding.

Each I and Q component output from analog receiver 712 may be comprised of multipath propagations of an identical pilot and corresponding information signals. In digital receiver 714 certain multipath propagations of the transmitted signal, as selected by a searcher receiver 715 in combination with a controller 718, are each processed by a different one of multiple data receivers or demodulators 720a–720c, which are also referred to as "fingers". Although only three data demodulating fingers (demodulators 720a–720c) are illustrated in FIG. 11, it should be understood that more or less fingers may be used. From the composite I and Q components each finger extracts, by despreading, the I and Q components RI and RQ of the pilot and data signals corresponding to a particular path.

The I and Q components of the pilot signal for each finger may be said to form a pilot vector, and the I and Q components of the I-channel and Q-channel data to form a pair of data vectors. In accordance with the invention, these I and Q components of the pilot and data vectors are extracted from the received signal energy in order to produce estimates of the I-channel and Q-channel data. The pilot signal is typically transmitted at a greater signal strength than the data signals, and as such the magnitude of the pilot signal vector is greater than the received data signal vectors. Accordingly, the pilot signal vector can be used as an accurate phase reference for signal processing.

In the transmission process the pilot and data signals as transmitted travel the same path to the receiver. However, due to channel noise the received signal will generally be offset from the transmitted phase angle. The formulation of the dot, i.e., scalar, products of the pilot signal vector with I-channel and Q-channel data signal vectors are used as disclosed herein to extract the I-channel and Q-channel data from the signal received by the selected receiver finger. In particular, the dot product is used to find the magnitudes of the components of the data vectors that are in phase with the pilot vector by projecting the pilot vectors onto each of the data vectors. One procedure for extracting the pilot signal from the signal energy received by the selected receiver finger is described below with reference to FIG. 8, and also in copending U.S. patent application Ser. No. 07/981,034, filed Nov. 24, 1992, entitled "PILOT CARRIER DOT PRODUCT CIRCUIT", which is assigned to the assignee of the present invention, and which is herein incorporated by reference.

Recovery of Coset-Encoded Symbol Substreams

In what follows there will be described in detail the recovery from the I-channel transmitted data a single coset-encoded substream, a(i), where $$a(i)=A(i) \oplus S_i=(A_{i1} \oplus S_{i1}, \ldots, A_{i1} \oplus S_{ip}).$$

It is assumed that prior to transmission to a $j^{th}$ (FIG. 8) of "N" receivers over the I and Q channels the substream a(i) is converted to a real sequence r(i), where $$r(i)=(-1)^{a(i)}=((-1)^{A_{i1} \oplus s_{i1}}, \ldots, (-1)^{A_{i1} \oplus s_{ip}})=(r_{i1}, \ldots, r_{ip})$$

After spreading by the Walsh waveform $W_j$ and by the sequences $PN_I$ and $PN_Q$, respectively, the resultant sequences $S_{Ij}$ and $S_{Qj}$ intended for reception by the $j^{th}$ receiver may be represented as $$S_{Ij} = \sum_{i=1}^{p} r(i)[W_j \cdot PN_I],$$

and $$S_{Qj} = \sum_{i=p+1}^{k} r(i)[W_j \cdot PN_Q],$$

The composite signal transmitted to the "N" receivers within a particular cell is given by $$S(t) = \bar{I}\cos(\omega_o t) - \bar{Q}\sin(\omega_o t);$$

where $$\bar{I} = \sum_{j=1}^{N} S_{Ij}; \bar{Q} = \sum_{j=1}^{N} S_{Qj}$$

For clarity of presentation it will be assumed that the signal S(t) propagates over an $m^{th}$ transmission path to the $j^{th}$ receiver, which allows the signal $R_j(t)$ received thereby to be expressed as:

$$R_j(t)=\bar{I} \cos(\omega_o t+\theta)-\bar{Q} \sin(\omega_o t+\theta)+n(t);$$

where the signal $R_j(t)$ has a random phase shift of θ relative to the local reference of the receiver, and where n(t) denotes the inherent signal interference noise.

Figure 12:
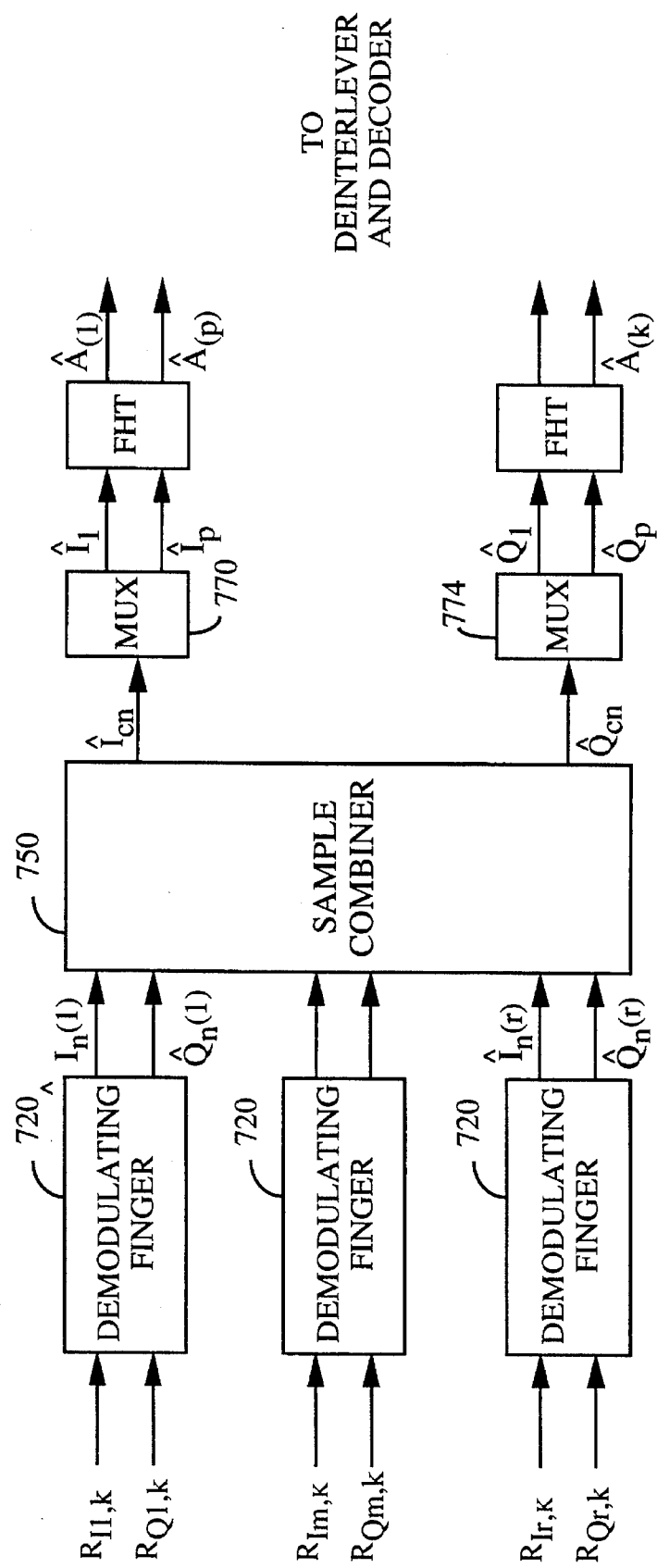
FIG. 12 is a block diagram of an exemplary diversity receiver disposed to receive the RF signal energy transmitted over the I and Q communication channels.

Referring to the block diagrammatic representation of FIG. 12, the $j^{th}$ receiver is seen to include a set of "r" demodulating fingers 720 disposed to process the signal $R_j(t)$ as received over "r" transmission paths. The signal Rj(t) transmitted over the $m^{th}$ path is passed through a bandpass filter having a transfer function h(t), and is sampled at times $t=kT_w$, where $T_w$ denotes the period between successive chips in the assigned Walsh waveform $W_j$. These operations produce the I and Q projections $R_{Im,k}$ and $R_{Qm,k}$ supplied to the $m^{th}$ demodulating finger 720, where $$R_{Im,k} = R_j(t) \cos(\omega_o t) * h(t)|_{t=kT_w + \tau_m} = \bar{I} \cos\theta - \bar{Q} \sin\theta + N_i;$$

$$R_{Qm,k} = -R_j(t) \sin(\omega_o t) * h(t)|_{t=kT_w + \tau_m} = \bar{I} \sin\theta + \bar{Q} \cos\theta + N_q$$

where $\tau_m$ corresponds to the delay associated with the $m^{th}$ transmission path, and where the noise terms $N_i$ and $N_q$ may be characterized as random processes of zero mean and variance $\sigma^2$. In accordance with the invention, estimates of the sequence r(i) transmitted over the $m^{th}$ transmission path are derived from the sampled projections $R_{Im,k}$ and $R_{Qm,k}$ by the $m^{th}$ receiver finger 720.

Figure 13:
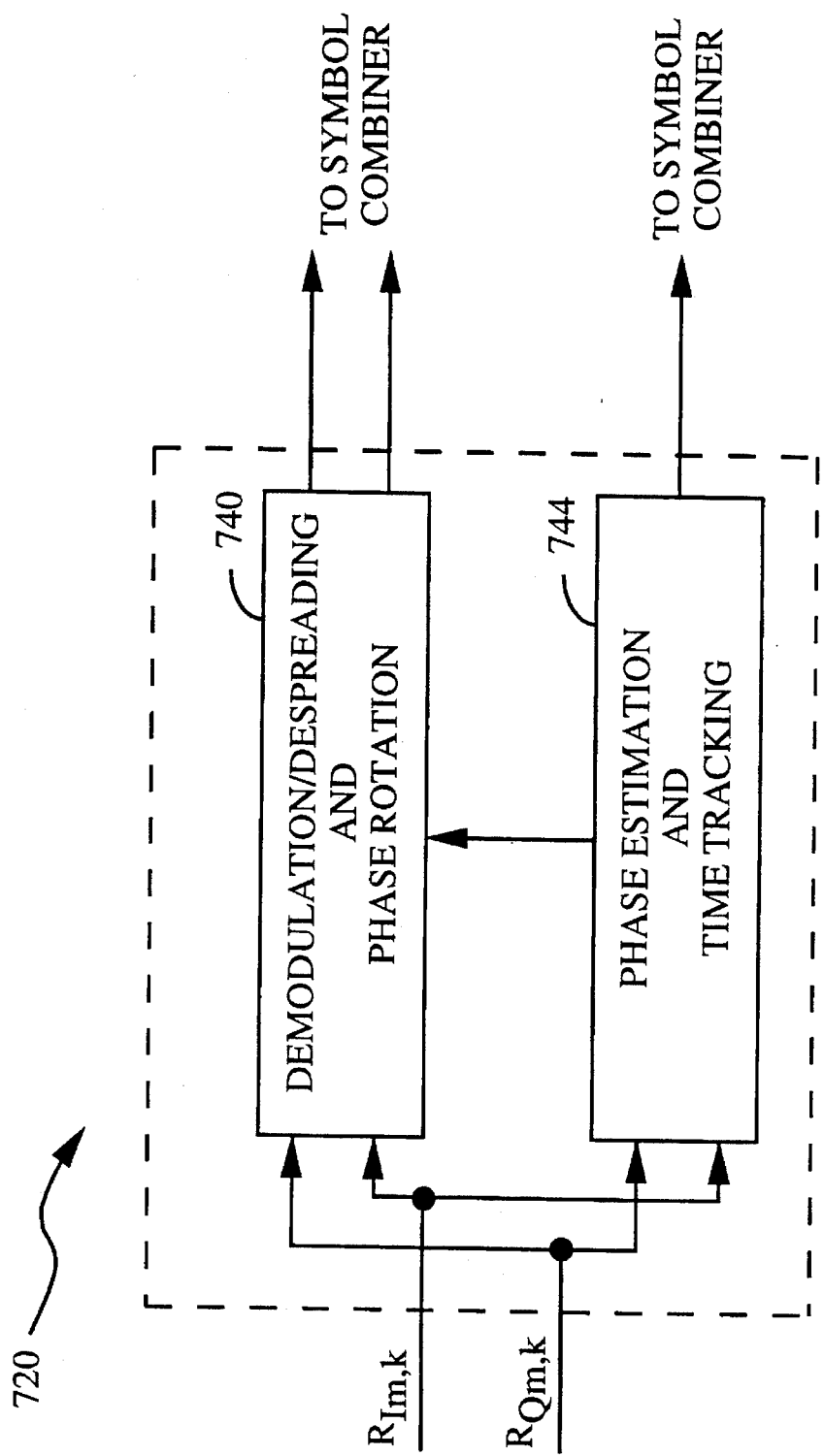
FIG. 13 is a block diagram of a receiver finger included within the diversity receiver of FIG. 12 designed to process signal energy received over a selected transmission path.

Referring to FIG. 13, there is shown a block diagram of the $m^{th}$ receiver finger 720 operative to process the sampled projections $R_{Im,k}$ and $R_{Qm,k}$. The receiver finger 720 includes a demodulation/despreading and phase rotation circuit 740, as well as a phase estimation and time tracking circuit 744. In accordance with the invention, the circuit 740 operates to demodulate the sampled projections $R_{Im,k}$ and $R_{Qm,k}$ by performing a first set of partial correlations using the assigned Walsh waveform $W_j$ and $PN_I$ sequence, and a second set of partial correlations using the assigned Walsh waveform and the $PN_Q$ sequence. Each partial correlation is performed over an interval of L/p Walsh chips, where L denotes the length of the Walsh waveform $W_j$ used to cover the "p" symbol substreams inherent within the sequences $S_{Ij}$ and $S_{Qj}$. The results of the partial correlations are then rotated in phase in order to produce the decision variables Ihat(m) and Qhat(m) output by the $m^{th}$ receiver finger 720. This phase rotation is performed in accordance with an estimated phase shift $\hat{\theta}$ between the transmitted waveform and a locally-generated reference. In a preferred implementation the phase estimation and time tracking circuit 744 includes a phase-locked for generating the phase estimate $\hat{\theta}$.

The phase estimation and time tracking circuit 744 operates to provide an estimate of the pilot signal ($P_m$) transmitted over the $m^{th}$ path on the basis of intermediate signals produced by the circuit 740 during demodulation and despreading of the sampled projections $R_{Im,k}$ and $R_{Qm,k}$. The extracted pilot signal is used for phase rotation of the partial correlations within circuit 740, as well as for time alignment within a sample combiner 750 (FIG. 12). The results of these independent correlations are used to produce the $m^{th}$ pair of decision variables I(hat)(m) and Q(hat)(m) provided to a sample combiner 750 (FIG. 12). Within the sample combiner 750 the decision variables Ihat(l), l=1 to r, produced by the set of "r" receiver fingers 720 are time-aligned and combined, as are the decision variables Qhat(m)

Figure 14:
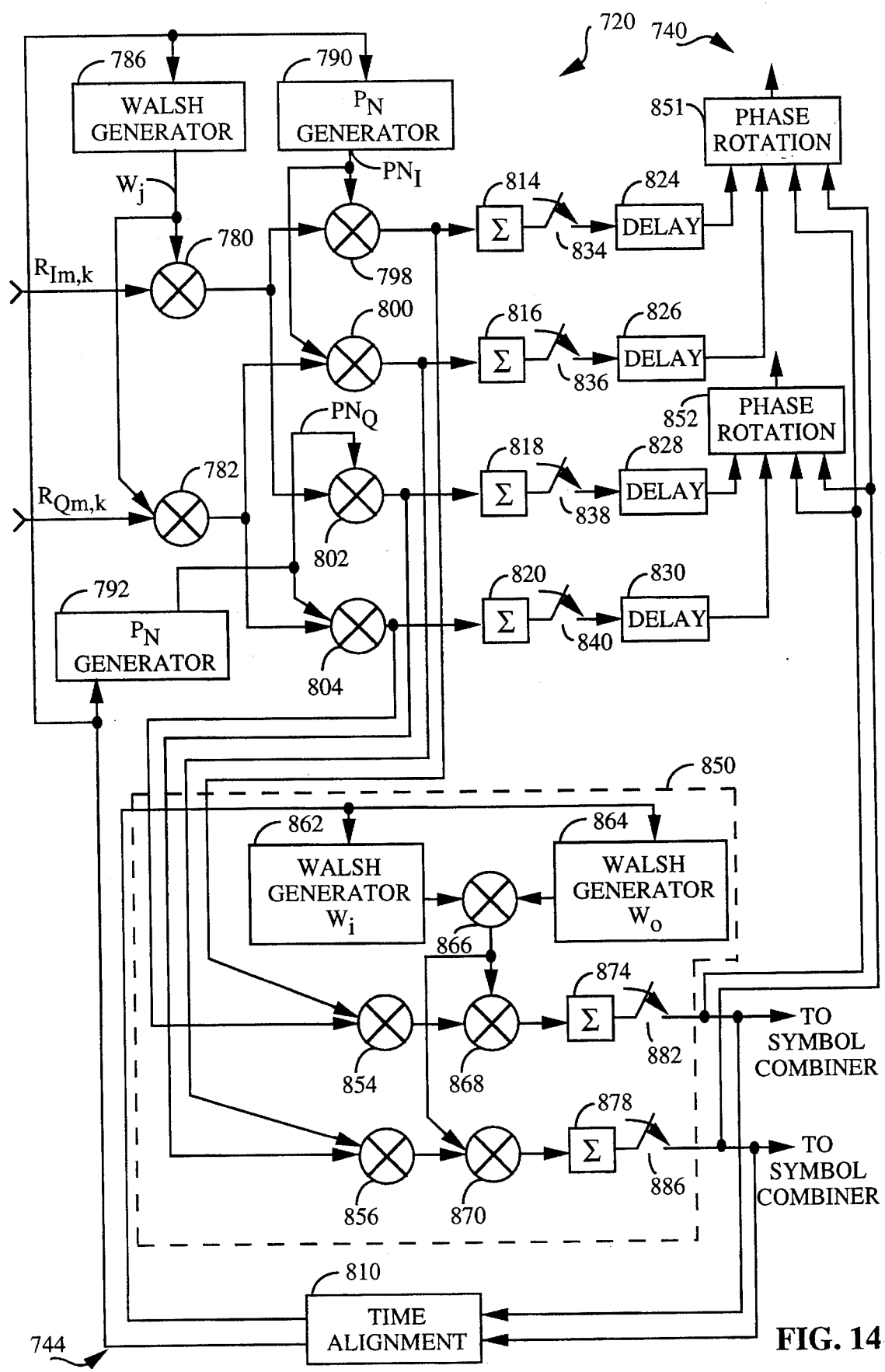
FIG. 14 provides a more detailed representation of the selected receiver finger illustrated in FIG. 13.

Referring to FIG. 14, the $m^{th}$ receiver finger 720 is seen to include multipliers 780 and 782 for receiving the sampled projections $R_{Im,k}$ and $R_{Qm,k}$ at the PN spreading rate of 1.2288 MHz. A Walsh generator 786 is connected to both of multipliers 780 and 782, where its output ($W_j$) is multiplied with the projections $R_{Im,k}$ and $R_{Qm,k}$. The receiver finger 720 further includes PN generators 790 and 792 for providing the $PN_I$ sequence to multipliers 798 and 800, and the $PN_Q$ sequence to multipliers 802 and 804. As is indicated by FIG. 14, the Walsh demodulated projections $R'_{Im,k}$ and $R'_{Qm,k}$ from multiplier 780 are multiplied with the $PN_I$ sequence at multiplier 798 and with the $PN_Q$ sequence at multiplier 802. Similarly, the output from multiplier 782 is multiplied with the $PN_I$ sequence at multiplier 800, and with the $PN_Q$ sequence at multiplier 804.

The multipliers 798 and 800 correlate the Walsh demodulated projections $R'_{Im,k}$ and $R'_{Qm,k}$ with the $PN_I$ sequence. Appropriate timing is maintained between the $PN_I$ sequence and the sequences $R'_{Im,k}$ and $R'_{Qm,k}$ by a time alignment circuit 810, the operation of which is discussed below. Similarly, the sequences $R'_{Im,k}$ and $R'_{Qm,k}$ are correlated with the $PN_Q$ sequence by multipliers 802 and 804. The correlated outputs of multipliers 798, 800, 802 and 804 are then provided to corresponding I-channel accumulators 814 and 816, and Q-channel accumulators 818 and 820. Accumulators 814, 816, 818 and 820 accumulate the input information over L/p Walsh chips, where, again, L denotes the length of the Walsh waveform $W_j$. The accumulators 814, 816, 818 and 820 are operative to produce partial correlations $A_{In}$, $A_{Qn}$, $B_{In}$, and $B_{Qn}$ during each of the "p" partial correlation intervals of length L/p Walsh chips (i.e., n=1 to p) occurring during each Walsh waveform. The partial correlations $A_{In}$, $A_{Qn}$, $B_{In}$, and $B_{Qn}$ are provided to delay elements 824, 826, 828 and 830 through corresponding switches 834, 836, 838 and 840. The switches are closed from normally-open positions at the conclusion of each partial correlation interval in accordance with timing signals provided by the time alignment circuit 810. The partial correlations $A_{In}$ and $A_{Qn}$ produced by the I-channel accumulators 814 and 816 at the conclusion of the $n^{th}$ correlation interval may be expressed as:

$$A_{In} = \sum_{k=\frac{64}{p}n+1}^{\frac{64}{p}(n+1)} R_{Ik} W_{jk} PN_{Ik} = \frac{64}{p} \sum_{j=1}^{p} r_{jn} \cos\theta,$$

$$A_{Qn} = \sum_{k=\frac{64}{p}n+1}^{\frac{64}{p}(n+1)} R_{Qk} W_{jk} PN_{Ik} = \frac{64}{p} \sum_{j=1}^{p} r_{jn} \sin\theta,$$

$$n = 1, \ldots, p,$$

it being understood that the partial correlations $B_{In}$ and $B_{Qn}$ may be represented in substantially similar manner. Referring to equations (12) and (13), the terms $r_{jn}$, j=1 to p, collectively represent an estimate of the "p" integral values included within the real sequence r(i) defined by equation (5). Referring again to FIG. 14, the phase estimation and time tracking circuit 744 includes a pilot extraction circuit 850 for producing pilot phase signals used in maintaining time alignment within the receiver finger 720. The pilot extraction circuit 850 includes a multiplier 854 to which is provided the outputs from multipliers 798 and 802, as well as a multiplier 856 for multiplying the outputs of multipliers 800 and 804. The circuit 850 further includes Walsh generators 862 and 864 operative to supply the Walsh waveforms $W_i$ and $W_o$, respectively, to a multiplier 866. The resultant demodulating waveform $W_i W_o$ produced by multiplier 866, appropriately time-aligned by virtue of the timing information provided by circuit 810 to Walsh generators 862 and 864, is provided to multipliers 868 and 870. The waveform $W_i W_o$ is multiplied with the output of multiplier 854 by multiplier 868, while multiplier 870 performs the same operation in response to the waveform $W_i W_o$ and the output provided by multiplier 856.

The outputs of multipliers 868 and 870 are respectively accumulated by pilot extraction accumulators 874 and 878 over an interval selected to ensure generation of an unbiased estimate of the phase of the received pilot signal. In an exemplary embodiment the accumulation interval spans a time period of duration 2 rL, where as noted above L corresponds to the Walsh symbol period. This accumulation interval will generally take place over the time periods of length "rL" occurring immediately before and after the time at which it is desired to estimate the pilot phase. Time alignment between the outputs produced by accumulators 814, 816, 818 and 820 and the outputs of pilot extraction accumulators 874 and 880 is maintained by the delay elements 824, 826, 828 and 830. The signal delay effected by each of the delay elements 824, 826, 828 and 830 is chosen to be of a duration equivalent to the interval spanned by the "r" future Walsh symbols. Accordingly, in generating the pilot estimate corresponding to the $n^{th}$ partial correlations $A_{In}$ and $A_{Qn}$, a set of data samples $D_j$, where $(L/p)(n-r)+1 \leq j \leq (L/p)(n+r)$, are accumulated by the accumulators 874 and 878.

The signals produced by the pilot extraction accumulators 882 and 886 correspond to I-channel and Q-channel projections of the pilot ($P_m$) signal transmitted over the $m^{th}$ path, and may be respectively represented as:

$$P_m \cdot \cos(\theta) = \sum_{(L/p)(n-r)+1}^{(L/p)(n+r)} \{R_{Im}PN_IW_0 + R_{Qm}PN_QW_0\} \quad (15)$$

$$P_m \cdot \sin(\theta) = \sum_{(L/p)(n-r)+1}^{(L/p)(n+r)} \{-R_{Im}PN_QW_0 + R_{Qm}PN_IW_0\} \quad (16)$$

Referring to FIG. 14, the I-channel and Q-channel projections of the pilot signal are each provided to both the I-channel phase rotator 850 and the Q-channel phase rotator 852. The I-channel phase rotator 850 produces a sequence of output data values corresponding to an estimate of the sequence r(t) transmitted over the $m^{th}$ path weighted by the pilot signal $P_m$. The decision term $\hat{I}_n(m)$ generated by the I-channel phase rotator 850 at the conclusion of the $n^{th}$ correlation interval may be represented as:

$$\hat{I}_n(m) = A_{In} \cdot P_m \cdot \cos(\theta) + A_{Qn} P_m \sin(\theta) = \frac{64}{p} \sum_{i=1}^{p} r_{in}.$$

The sample combiner 750 (FIG. 12) combines the I-channel decision terms $\hat{I}_n(i)$, i=1 to r, produced by the finger demodulators 720 during the $n^{th}$ correlation interval into a composite decision term $\hat{I}_{cn}$, and combines the Q-channel decision variables $\hat{Q}_n(i)$, into a composite decision term $\hat{Q}_{cn}$. The composite decision terms $\hat{I}_{cn}$ and $\hat{Q}_{cn}$ are serially output by the combiner 750 as the sequences, $$\hat{I}_c = (\hat{I}_1, \ldots, \hat{I}_p), \text{ and}$$

$$\hat{Q}_c = (\hat{Q}_1, \ldots, \hat{Q}_p),$$

where the subscripts indicate correspondence to the "p" symbol substreams combined into the real sequence r(i). The composite decision sequences $\hat{I}_c$ and $\hat{Q}_c$ are provided to I-channel and Q-channel multiplexers 870 and 874, which respectively produce the parallel outputs $$\hat{I}_c^T = (\hat{I}_1, \ldots, \hat{I}_p)^T, \text{ and}$$

$$\hat{Q}_c^T = (\hat{Q}_1, \ldots, \hat{Q}_p)^T.$$

In accordance with the invention, a set of estimates $\hat{A}_1(i)$ of the input symbol streams $A_1(i)$ transmitted over the I-channel, where i=1 to p, is generated by performing a decorrelation of the decision sequence $\hat{I}_c$ based on the coset codes inherent within the sequence r(i). More specifically, an estimate of the $i^{th}$ symbol stream $A_i(i)$ is made through the following computation of the inner product of r(i) with the decision sequence $\hat{I}_i(i)$:

$$\hat{A}(i) = \sum_{n=1}^{p} \hat{I}_n(i) \, (-1)^{c_{i,n}} = 64 \, (-1)^{A(i)}$$

where $c_{i,n}$ denotes the $n^{th}$ term of the coset code $c_i$ used to encode the $i^{th}$ symbol stream. The computation specified by equation (18) relies on the orthogonality between the coset codes used to encode the input symbol streams. That is, $$\hat{A}(i) = \sum_{n=1}^{p} \hat{I}_n(i) \, (-1)^{c_{j,n}} = 0$$

for all j≠i. For p≥4 equation (18) may be solved by performing, for example, a Fast Hadamard Transform (FHT) upon the upon the sequences $\hat{I}_c^T$ provided the multiplexer 870 (FIG. 12). The symbol stream estimates are then deinterleaved and decoded in order to estimate the transmitted data.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

What is claimed is:

1. A transmitter for modulating an information signal for transmission in a spread spectrum communication system comprising:

means for demultiplexing said information signal into first and second subsignals;

first means for combining said first subsignal with a first coset code and for combining said second subsignal with a second coset code orthogonal to said first coset code so as to produce a first composite coset-encoded signal;

means for generating an orthogonal function signal; and means for modulating said first composite coset-encoded signal with said orthogonal function signal in order to provide a first modulated signal.

2. The transmitter of claim 1 further including:

means for generating a pseudorandom noise signal of predetermined PN code, and means for combining said first modulated signal with said pseudorandom noise signal of predetermined PN code so as to provide a first output signal.

3. The transmitter of claim 1 further including:

means for demultiplexing said information signal into third and fourth subsignals, second means for combining said third subsignal with a third coset code and for combining said fourth subsignal with a fourth coset code so as to produce a second composite coset-encoded signal, said first, second third and fourth coset codes being mutually orthogonal, and means for modulating said second composite coset-encoded signal with said orthogonal function signal in order to provide a second modulated signal.

4. The transmitter of claim 3, said transmitter further including:

means for generating in-phase pseudorandom noise ($PN_I$) and quadrature phase pseudorandom noise ($PN_Q$) signals of predetermined PN codes, and means for combining said $PN_I$ signal with said first modulated signal to provide an I output signal, and for combining said $PN_Q$ signal with said second modulated signal to provide a Q output signal.

5. The transmitter of claim 4, said transmitter further including means for modulating in-phase (I) and quadrature phase (Q) carrier signals of a predefined phase relationship with said I and Q output signals, respectively.

6. The transmitter of claim 1 wherein said first means for combining includes:

first means for replicating said first subsignal into first and second identical symbol streams, first means for multiplying each of said symbol streams by a coset code coefficient of said first coset code in order to provide first and second intermediate sequences, a first multiplexer for combining said first and second intermediate sequences into a first coset-encoded signal, second means for replicating said second subsignal into third and fourth identical symbol streams, second means for multiplying said third and fourth symbol streams by a coset code coefficient of said second coset code in order to provide third and fourth intermediate sequences, a second multiplexer for combining said third and fourth intermediate sequences into said first coset-encoded signal, and means for combining said first and second coset-encoded signals into said first composite-encoded signal.

7. The transmitter of claim 1 wherein said means for combining said first and second coset-encoded signals includes means for converting said first and second coset-encoded signals into integer values selected from a set of integers including +1 and −1.

8. A transmitter for modulating a set of p information signals of equivalent data rate for simultaneous transmission in a spread spectrum communication system, comprising:

means for combining each of said information signals with one of a set of p coset codes to produce a set of p coset-encoded signals;

means for combining said p coset-encoded signals and for generating a composite coset-encoded signal;

means for generating an orthogonal function signal; and means for modulating said composite coset-encoded signal with said orthogonal function signal in order to provide a first modulated signal.

9. The transmitter of claim 8, said transmitter further including:

means for generating a pseudorandom noise signal of predetermined PN code, and means for combining said modulated signal with said pseudorandom noise signal of predetermined PN code so as to provide a first output signal.

10. The transmitter of claim 8 wherein said means for combining said information signals with said coset codes includes:

means for replicating a first of said information signals into a set of p identical symbol streams, means for multiplying each of said symbol streams by one of a set of p coset code coefficients included within a first of said coset codes in order to provide a set of p intermediate sequences, and a multiplexer for combining said p intermediate sequences into a first of said coset-encoded signals.

11. The transmitter of claim 5, said transmitter further including means for transmitting said I-modulated and said Q-modulated carrier signals over I and Q communication channels, respectively.

12. A spread spectrum communication system for modulating an information signal to be transmitted on in-phase (I) and quadrature phase (Q) using a carrier signal and a replica of said carrier signal in phase quadrature therewith, said system including a transmitter comprising:

means for demultiplexing said information signal into first and second sets of subsignals;

means for combining said first set of subsignals with a first set of orthogonal coset codes to produce a first composite coset-encoded signal, and for combining said second set of subsignals with a second set of orthogonal coset codes so as to produce a second composite coset-encoded signal;

means for generating an orthogonal function signal;

means for generating in-phase pseudorandom noise ($PN_I$) and quadrature phase pseudorandom noise ($PN_Q$) signals of predetermined PN codes; and means for combining said $PN_I$ signal with said first composite coset-encoded signal and said orthogonal function signal to provide an I modulation signal, and for combining said $PN_Q$ signal with said second composite coset-encoded signal and said orthogonal function signal to provide a Q modulation signal.

13. The system of claim 12 further including:

means for modulating said carrier signal with said I modulation signal and for modulating said replica of said carrier signal with said Q modulation signal in order to provide I-modulated and Q-modulated carrier signals, respectively, and means for transmitting said I-modulated and said Q-modulated carrier signals over said I and Q communication channels.

14. The system of claim 13 further including a receiver comprising:

means for producing an estimate of said information signal in accordance with said I-modulated and Q-modulated carrier signals received over said I and Q communication channels.

15. The communication system of claim 14 wherein said receiver further includes means for producing intermediate received signals by demodulating said received carrier signals using a replica of said orthogonal function signal.

16. The communication system of claim 15 wherein said receiver further includes:

means for generating a first despreading signal by replicating said $PN_I$ signal, and first means for correlating said intermediate received signals using said first despreading signal in order to provide a first set of in-phase (I) and quadrature phase (Q) projection signals.

17. The communication system of claim 16 further including:

means for combining said orthogonal function signal with a pilot signal in order to provide a modulated pilot signal, means for transmitting said modulated pilot signal over a pilot channel.

18. The communication system of claim 17 wherein said receiver further includes:

means for demodulating said modulated pilot signal transmitted over said pilot channel, means for producing an estimate of said pilot signal transmitted over said pilot channel, first phase rotation means for generating said estimate of said first information signal on the basis of said first set of said I and Q projections and said estimate of said pilot carrier signal.

19. The communication system of claim 18 wherein said receiver further includes:

means for generating a second despreading signal by replicating said $PN_Q$ signal, and second means for correlating said intermediate received signals using said second despreading signal in order to provide a second set of in-phase (I) and quadrature phase (Q) projection signals.

20. The communication system of claim 19 wherein said receiver further includes second phase rotation means for generating an estimate of said second information signal on the basis of said second set of I and Q projections and said estimate of said transmitted pilot carrier signal.

21. The communication system of claim 18 wherein said receiver further includes means for delaying said first set of I and Q projection signals.

22. A method for modulating an information signal for transmission in a spread spectrum communication system, comprising the steps of:

demultiplexing said information signal into first and second subsignals;

combining said first subsignal with a first coset code and combining said second subsignal with a second coset code orthogonal to said first coset code so as to produce a first composite coset-encoded signal;

generating an orthogonal function signal; and modulating said first composite coset-encoded signal with said orthogonal function signal in order to provide a first modulated signal.

23. The method of claim 22 further including the steps of:

generating a pseudorandom noise signal of predetermined PN code, and combining said first modulated signal with said pseudorandom noise signal of predetermined PN code so as to provide a first output signal.

24. The method of claim 23 further including the steps of:

demultiplexing said information signal into third and fourth subsignals, combining said third subsignal with a third coset code and combining said fourth subsignal with a fourth coset code so as to produce a second composite coset-encoded signal, said first, second third and fourth coset codes being mutually orthogonal, and modulating said second composite coset-encoded signal with said orthogonal function signal in order to provide a second modulated signal.

25. The method of claim 24 further including the steps of:

generating in-phase pseudorandom noise ($PN_I$) and quadrature phase pseudorandom noise ($PN_Q$) signals of predetermined PN codes, and combining said $PN_I$ signal with said first modulated signal to provide an I output signal, and combining said $PN_Q$ signal with said second modulated signal to provide a Q output signal.

26. A method for modulating a set of p information signals of equivalent data rate for simultaneous transmission in a spread spectrum communication system, comprising the steps of:

combining each of said information signals with one of a set of p coset codes to produce a set of p coset-encoded signals;

combining said p coset-encoded signals and so as to generate a composite coset-encoded signal;

modulating said composite coset-encoded signal with an orthogonal function signal in order to provide a first modulated signal.

27. In a code division multiple access (CDMA) communication system, a method for providing in-phase (I) and quadrature phase (Q) spread spectrum communication channels over which is transmitted an information signal, said method comprising the steps of:

demultiplexing said information signal into first and second sets of subsignals;

combining said first set of subsignals with a first set of orthogonal coset codes to produce a first composite coset-encoded signal, and combining said second set of subsignals with a second set of orthogonal coset codes so as to produce a second composite coset-encoded signal;

generating in-phase pseudorandom noise ($PN_I$) and quadrature phase pseudorandom noise ($PN_Q$) signals of predetermined PN codes; and combining said $PN_I$ signal with said first composite coset-encoded signal and an orthogonal function signal to provide an I modulation signal, and combining said $PN_Q$ signal with said second composite coset-encoded signal and said orthogonal function signal to provide a Q modulation signal.

28. The method of claim 27 further including the steps of:

modulating said carrier signal with said I modulation signal and modulating said replica of said carrier signal with said Q modulation signal in order to provide I-modulated and Q-modulated carrier signals, respectively, and transmitting said I-modulated and said Q-modulated carrier signals over said I and Q communication channels.

29. The method of claim 28 further including the step of receiving said I-modulated and Q-modulated carrier signals transmitted over said I and Q communication channels, and for producing an estimate of said information signal in accordance therewith.

30. The method of claim 29 wherein said step of producing an estimate of said information signal includes the step of demodulating said received carrier signals using replicas of said orthogonal function signal, said $PN_I$ signal and said $PN_Q$ signal.

* * * * *